United States Patent
Furukawa et al.

(10) Patent No.: US 10,164,827 B2
(45) Date of Patent: Dec. 25, 2018

(54) INFORMATION PROCESSING SYSTEM AND INFORMATION PROCESSING METHOD

(71) Applicant: FUJITSU LIMITED, Kawasaki-shi, Kanagawa (JP)

(72) Inventors: Yushiro Furukawa, Yokohama (JP); Yusuke Hara, Yokohama (JP); Mayuko Morita, Yokohama (JP); Kazuhiro Miyashita, Yokohama (JP); Futoshi Watanabe, Kawasaki (JP); Yuta Kawamura, Kawasaki (JP); Makoto Yoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/967,015

(22) Filed: Dec. 11, 2015

(65) Prior Publication Data

US 2016/0182292 A1 Jun. 23, 2016

(30) Foreign Application Priority Data

Dec. 19, 2014 (JP) .................................. 2014-257646

(51) Int. Cl.
*H04L 12/24* (2006.01)
*H04L 12/713* (2013.01)

(52) U.S. Cl.
CPC ...... *H04L 41/0813* (2013.01); *H04L 41/0803* (2013.01); *H04L 41/12* (2013.01); *H04L 41/085* (2013.01); *H04L 45/586* (2013.01)

(58) Field of Classification Search
CPC ........... G06F 2009/45595; H04L 41/08; H04L 41/0803; H04L 41/0806; H04L 41/0813;

(Continued)

(56) References Cited

U.S. PATENT DOCUMENTS 9,811,435 B2 * 11/2017 Babakhan ............. G06F 11/301
2006/0080425 A1 * 4/2006 Wood .................. H04L 67/1095
709/223

(Continued)

FOREIGN PATENT DOCUMENTS

JP 2004-48340 2/2004
JP 2012-65015 A 3/2012

(Continued)

OTHER PUBLICATIONS

Japanese Office Action dated Sep. 25, 2018 for corresponding Japanese Patent Application No. 2014-257646, with English Translation, 6 pages.

*Primary Examiner* — Vivek Srivastava
*Assistant Examiner* — William C McBeth
(74) *Attorney, Agent, or Firm* — Fujitsu Patent Center

(57) ABSTRACT

An information processing system includes a storage unit that stores association information that is obtained by associating identifying information of a plurality of second communication networks that are interconnected via a first communication network with identifying information of a virtual device that exists in the second communication network; a first specifying unit that specifies according to the association information a second communication network in which a target virtual device exists, in a case in which the first specifying unit acquires a request for a setting change to the target virtual device; a second specifying unit that specifies a physical server on which the target virtual device runs from among physical servers that exist in the specified second communication network; and a setting unit that performs the setting change to the target virtual device that runs on the specified physical server.

9 Claims, 24 Drawing Sheets

(58) Field of Classification Search
CPC ... H04L 41/085; H04L 41/0886; H04L 41/12; H04L 45/586; H04L 67/10
See application file for complete search history.

(56) References Cited

U.S. PATENT DOCUMENTS

| | | | | |
|---|---|---|---|---|
| 2007/0198665 | A1* | 8/2007 | De Matteis | H04L 41/0806 709/220 |
| 2009/0323555 | A1* | 12/2009 | Lancaster | H04L 41/0806 370/254 |
| 2010/0094980 | A1* | 4/2010 | Sarkar | H04L 41/0806 709/221 |
| 2012/0278802 | A1* | 11/2012 | Nilakantan | H04L 41/0886 718/1 |
| 2012/0311108 | A1 | 12/2012 | Brandwine et al. | |
| 2012/0311120 | A1* | 12/2012 | Yasuda | H04L 41/0803 709/223 |
| 2013/0034015 | A1* | 2/2013 | Jaiswal | H04L 41/0843 370/254 |
| 2013/0111036 | A1 | 5/2013 | Ozawa et al. | |
| 2013/0227097 | A1* | 8/2013 | Yasuda | H04L 41/0813 709/222 |
| 2013/0227338 | A1* | 8/2013 | Lingafelt | H04L 41/12 714/4.5 |
| 2013/0318219 | A1* | 11/2013 | Kancherla | H04L 49/70 709/222 |
| 2014/0122681 | A1* | 5/2014 | Imai | H04L 41/04 709/223 |
| 2014/0133358 | A1* | 5/2014 | Yin | H04L 41/12 370/254 |
| 2015/0043379 | A1* | 2/2015 | Shimokuni | H04L 45/586 370/254 |
| 2015/0074262 | A1* | 3/2015 | Antony | H04L 45/586 709/224 |
| 2015/0124814 | A1* | 5/2015 | De Silva | H04L 45/745 370/392 |
| 2015/0363221 | A1* | 12/2015 | Terayama | G06F 9/45558 718/1 |
| 2016/0191371 | A1* | 6/2016 | Dujodwala | H04L 45/586 370/254 |
| 2017/0111236 | A1* | 4/2017 | Bielenberg | H04L 41/22 |

FOREIGN PATENT DOCUMENTS

| | | |
|---|---|---|
| JP | 2012-511878 | 5/2012 |
| JP | 2013-97394 | 5/2013 |
| WO | 2010/068618 | 6/2010 |

* cited by examiner

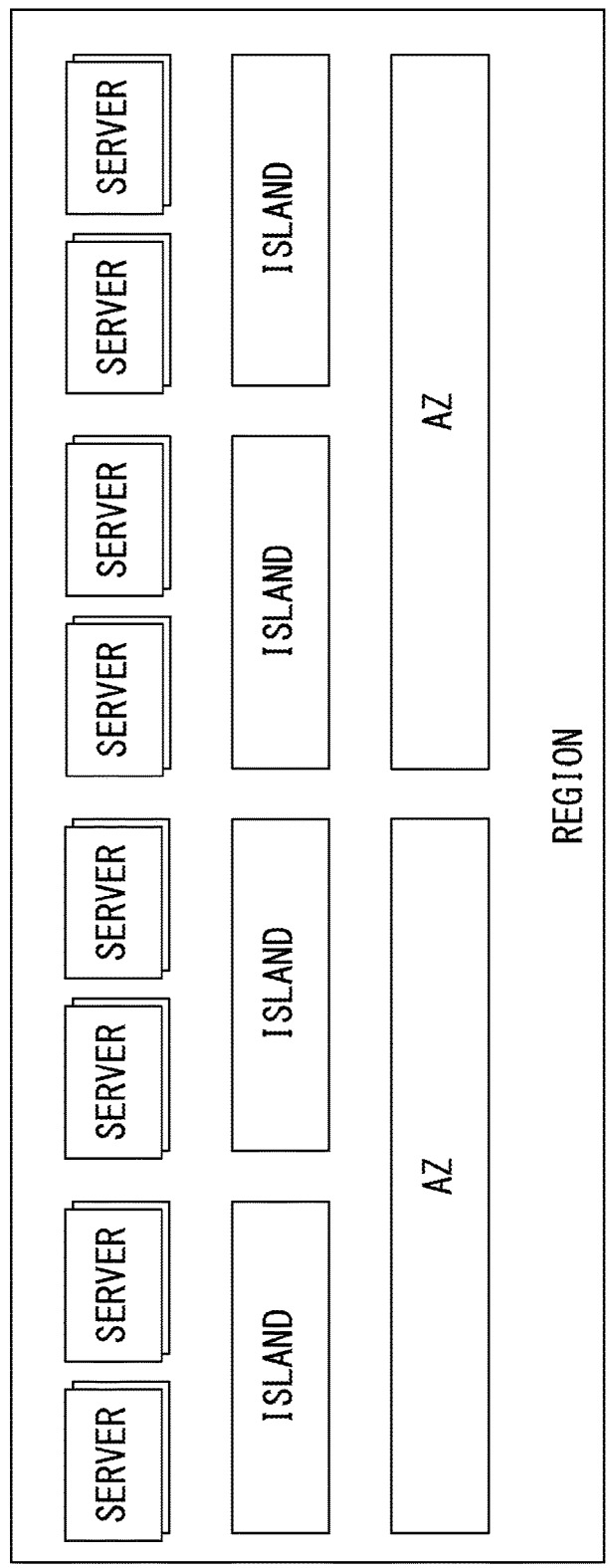
F I G. 1

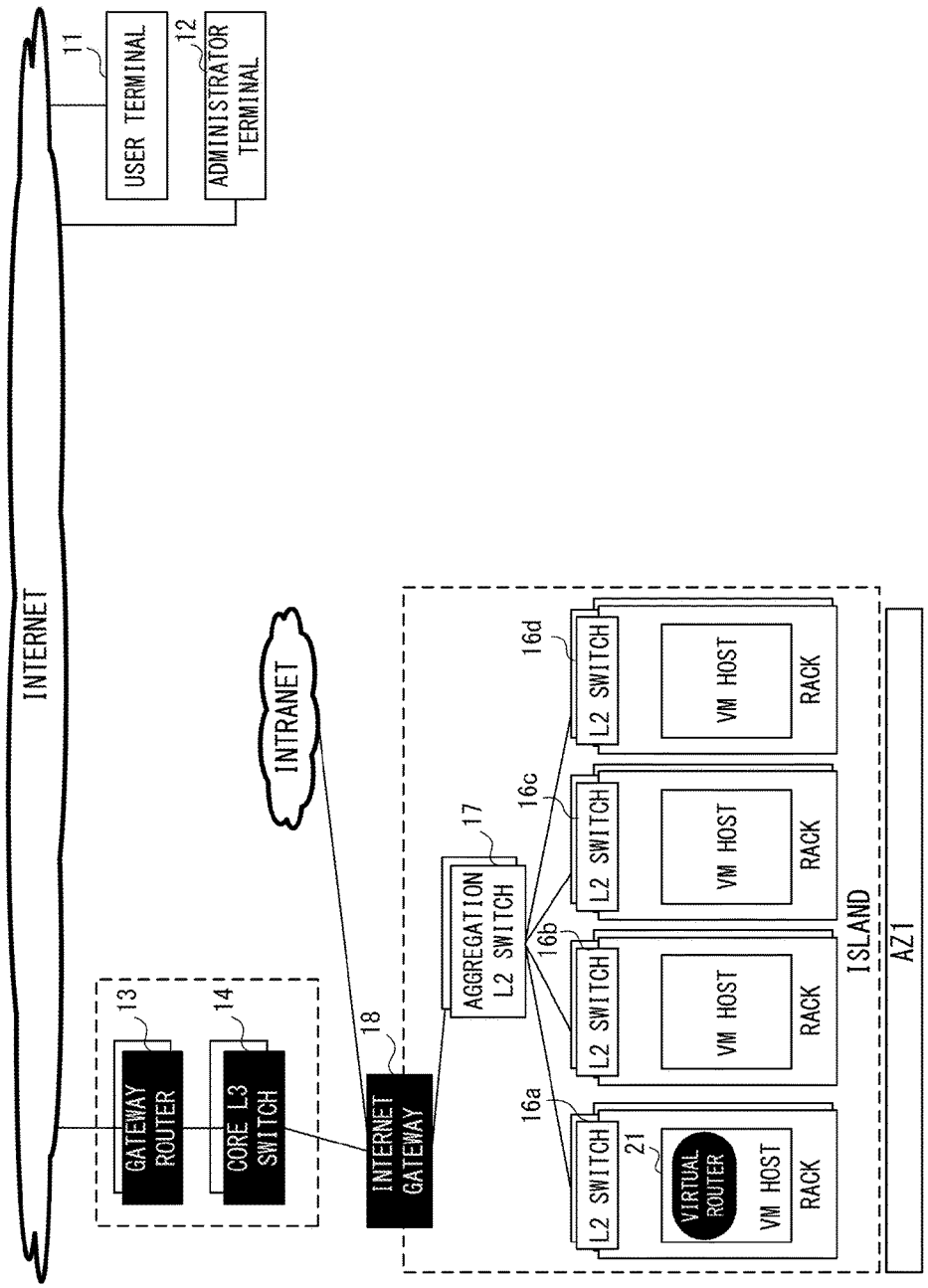
F I G. 4

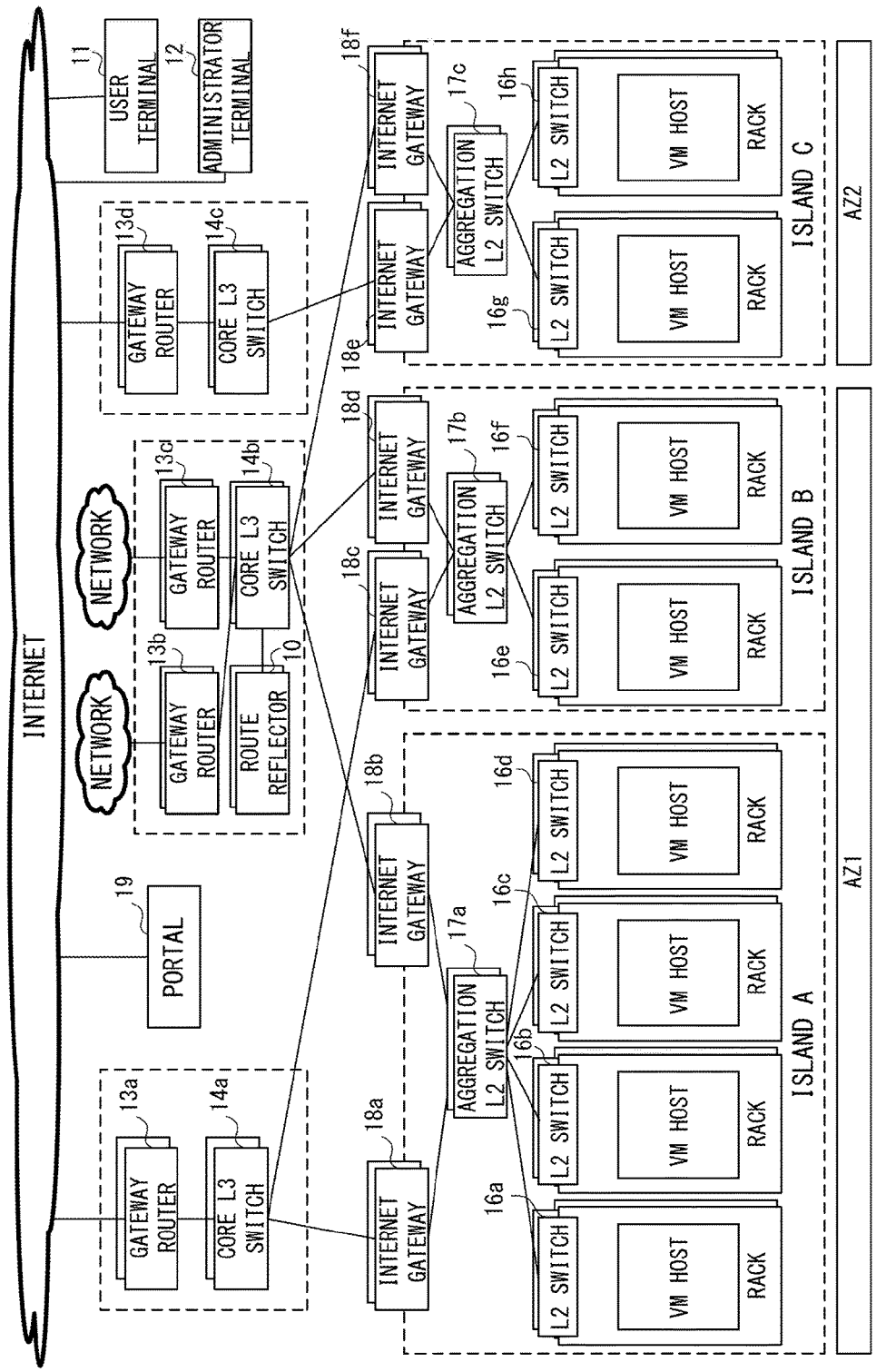
F I G. 5

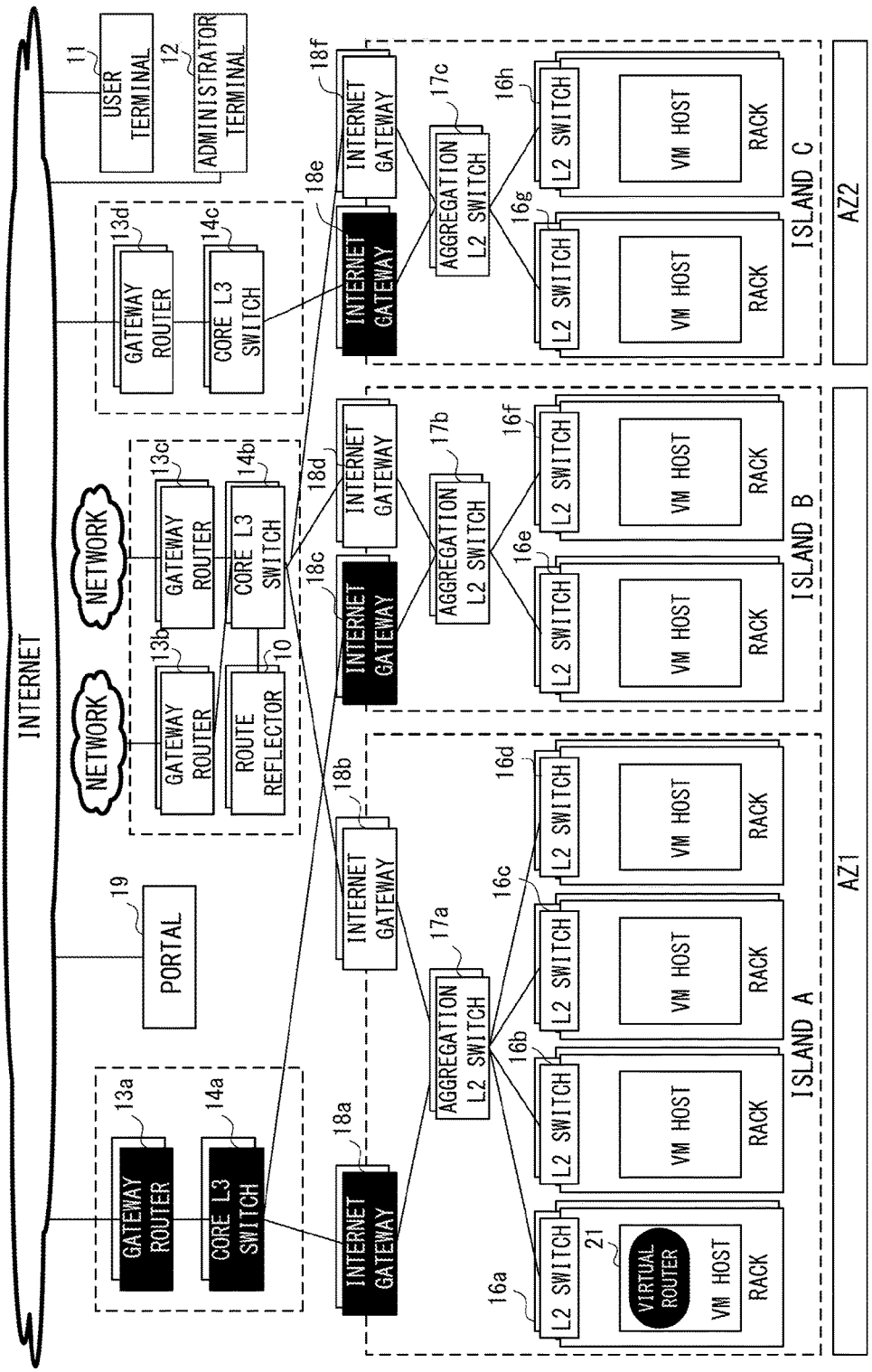
F I G. 7

| UUID | AZ | ISLAND |
|---|---|---|
| yyyyyyyy-yyyy-yyyy-yyyy-yyyyyyyyyyyy | AZ1 | ISLAND 1 |
| ssssssss-ssss-ssss-ssss-ssssssssssss | AZ1 | ISLAND 2 |
| tttttttt-tttt-tttt-tttt-tttttttttttt | AZ2 | ISLAND 1 |

F I G. 1 0

| AZ | ISLAND | MODEL | SETTING CONTENT |
|---|---|---|---|
| AZ1 | ISLAND 1 | x | A |
| AZ1 | ISLAND 2 | y | B |
| AZ2 | ISLAND 1 | z | C |

F I G. 1 1

| CONTROLLER | AZ | ISLAND | TYPE |
|---|---|---|---|
| 10.0.1.100 | AZ1 | ISLAND 1 | ISLAND CONTROLLER |
| 10.0.1.150 | AZ1 | ISLAND 2 | ISLAND CONTROLLER |
| 10.0.1.200 | AZ2 | ISLAND 1 | GATEWAY CONTROLLER |

F I G. 1 2

| VIRTUAL ROUTER | GATEWAY IP | AZ |
|---|---|---|
| yyyyyyyy-yyyy-yyyy-yyyy-yyyyyyyyyyyy | 100.64.0.1 | AZ1 |
| ssssssss-ssss-ssss-ssss-ssssssssssss | 100.64.0.2 | AZ1 |
| tttttttt-tttt-tttt-tttt-tttttttttttt | 100.64.0.3 | AZ2 |

FIG. 13

| NETWORK | PORT | VIRTUAL ROUTER/VM |
|---|---|---|
| net1 | Port_VM1 | xxxxxxxx-xxxx-xxxx-xxxx-xxxxxxxxxxxx |
| | Port_router | yyyyyyyy-yyyy-yyyy-yyyy-yyyyyyyyyyyy |
| net2 | Port_VM2 | zzzzzzzz-zzzz-zzzz-zzzz-zzzzzzzzzzzz |
| | Port_router | rrrrrrrr-rrrr-rrrr-rrrr-rrrrrrrrrrrr |

FIG. 14

| GATEWAY | AZ | ISLAND |
|---|---|---|
| 100.64.0.10 | AZ1 | ISLAND 1 |
| 100.64.0.15 | AZ1 | ISLAND 2 |
| 100.64.0.125 | AZ2 | ISLAND 1 |

FIG. 15

| VM HOST IP | HOST NAME | AZ | ISLAND |
|---|---|---|---|
| 100.64.0.10 | A1-xx-x | AZ1 | ISLAND 1 |
| 100.64.0.15 | A1-xy-x | AZ1 | ISLAND 2 |
| 100.64.0.125 | A2-xx-x | AZ2 | ISLAND 1 |

FIG. 16

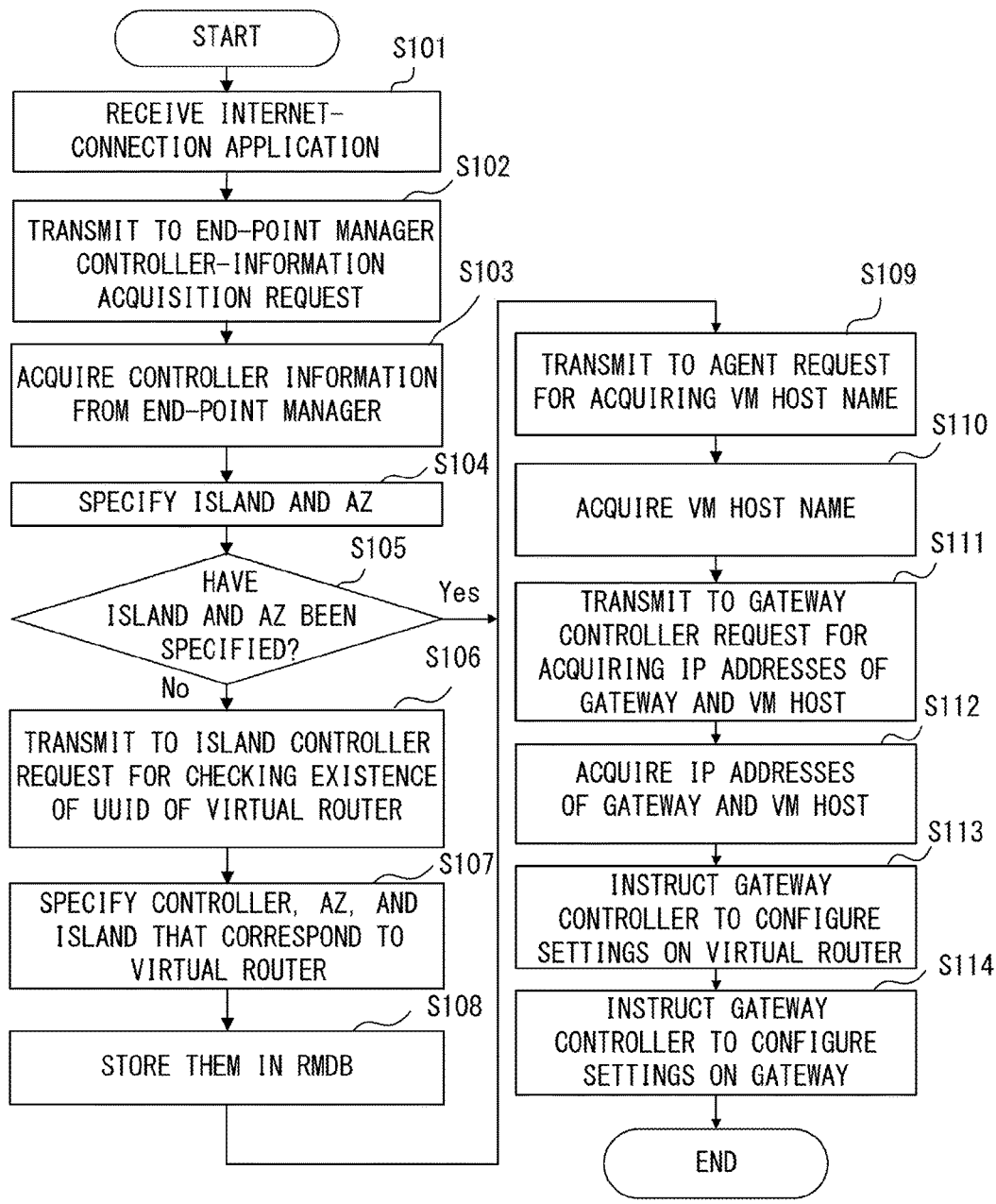
F I G. 1 7

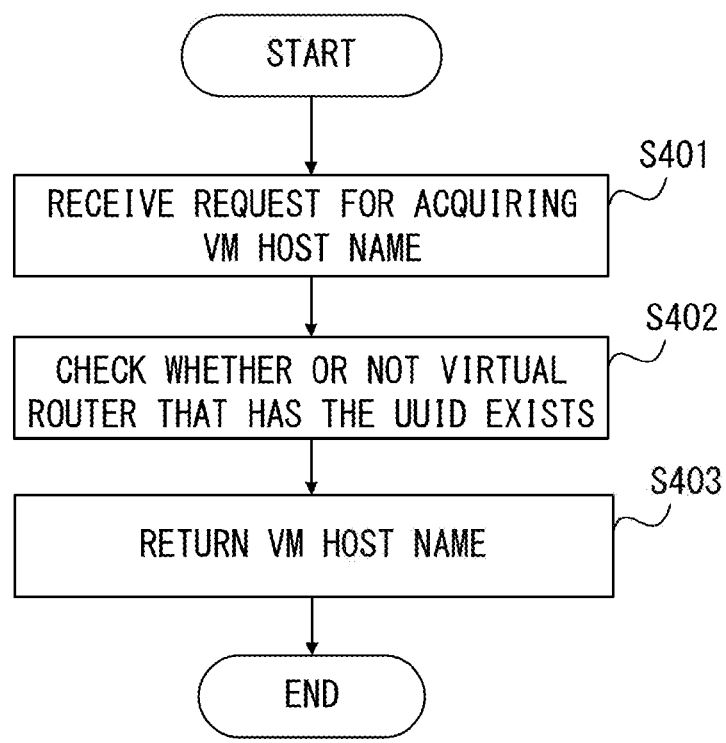
F I G. 2 0

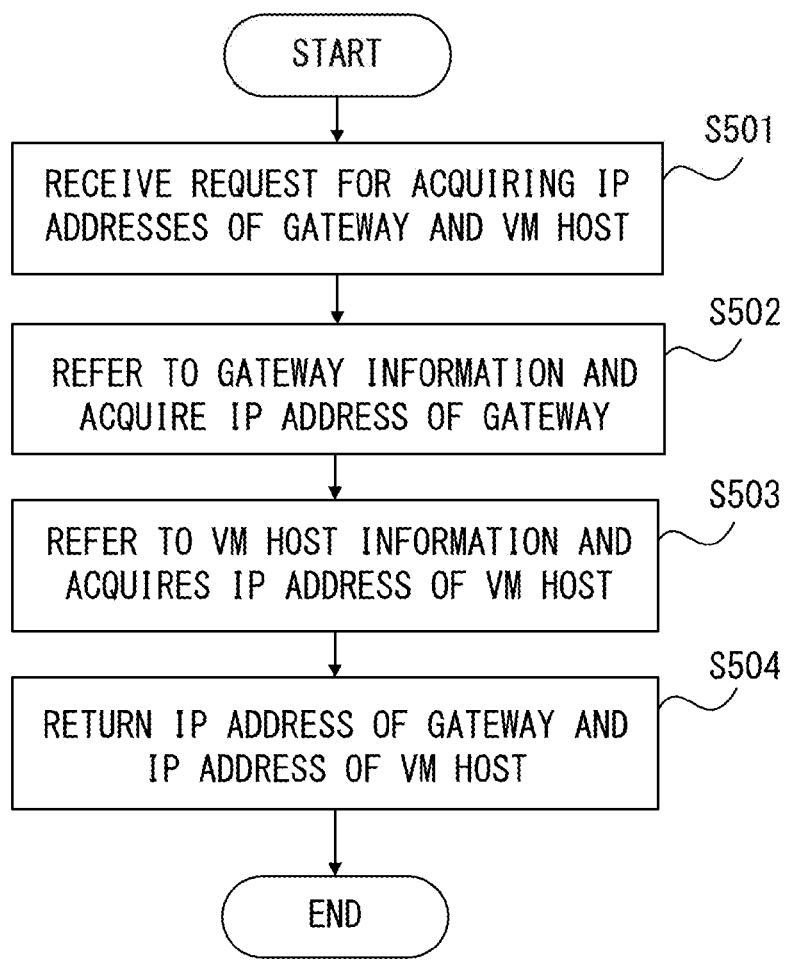
F I G. 21

INFORMATION PROCESSING SYSTEM AND INFORMATION PROCESSING METHOD

CROSS-REFERENCE TO RELATED APPLICATION

This application is based upon and claims the benefit of priority of the prior Japanese Patent Application No. 2014-257646, filed on Dec. 19, 2014, the entire contents of which are incorporated herein by reference.

FIELD

The embodiments discussed herein are related to an information processing system, an information processing method, and an information processing device.

BACKGROUND

A cloud service exists in which a service provider provides to a user hardware resources, etc., via a communication network. In the cloud service, for example, a computer infrastructure such as a virtualized platform is provided.

The service provider manages an information processing system that includes hardware resources that are provided to the user. Part of the information processing system is used on demand by the user. Therefore, according to the request from the user, the configuration of the information processing system that is managed by the service provider is frequently changed. A network configuration is included in the resources that are provided to the user. Thus, the service provider frequently changes settings on the network equipment of the information processing system. Note that in the following description, a virtual network device is included in the network equipment.

Incidentally, information processing systems that are managed by the service provider are operated all over the world. FIG. 1 is an explanatory diagram of the locations of the information processing systems. Units of locations where the information processing systems are operated are a region, an availability zone (hereinafter referred to as an AZ), and an island.

In FIG. 1, the region is a unit of a geographically distant area in which the information processing system is operated. The region includes one or a plurality of AZs. The AZ is a unit of a data center. In order to prevent a failure of one AZ from affecting another AZ, physical infrastructures such as a power source, air-conditioning, physical security, and a network are separate systems for each AZ. The AZ includes one or a plurality of islands. The island is a unit of a device group that is included in one network that is connected to an external network such as the Internet. Each island is connected with the others via another network.

In the information processing system that is managed by the service provider, the range of deployable resources is limited for each island. However, in recent years, it has become possible to deploy resources across islands or across AZs.

Note that techniques that are described in the following documents are known.
Japanese National Publication of International Patent Application No. 2012-511878
Japanese Laid-open Patent Publication No. 2013-97394
Japanese National Publication of International Patent Application No. 2004-48340

SUMMARY

According to an aspect of the embodiment, an information processing system includes a storage unit that stores association information that is obtained by associating identifying information of a plurality of second communication networks that are interconnected via a first communication network with identifying information of a virtual device that exists in the second communication network; a first specifying unit that specifies according to the association information a second communication network in which a target virtual device exists, in a case in which the first specifying unit acquires a request for a setting change to the target virtual device; a second specifying unit that specifies a physical server on which the target virtual device runs from among physical servers that exist in the specified second communication network; and a setting unit that performs the setting change to the target virtual device that runs on the specified physical server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of locations in an information processing system.

FIG. 4 is an explanatory diagram (Part 1) of network equipment that is a target for a setting change.

FIG. 5 illustrates an example of the configuration of the information processing system in a case in which resources are deployed across a plurality of islands.

FIG. 7 is an explanatory diagram (Part 2) of the network equipment that is a target for a settings change.

FIG. 10 illustrates an example of the configuration of an RMDB.

FIG. 11 illustrates an example of model information.

FIG. 12 illustrates an example of the configuration of an EMDB.

FIG. 13 illustrates an example of the configuration of router information.

FIG. 14 illustrates an example of the configuration of network information.

FIG. 15 illustrates an example of the configuration of gateway information.

FIG. 16 illustrates an example of the configuration of VM host information.

FIG. 17 is an example of the flowchart illustrating details of the Internet-connection application process of a region manager.

FIG. 20 is an example of the flowchart illustrating details of the response process of an agent for a request to acquire a VM host name.

FIG. 21 is an example of the flowchart illustrating details of the response process of a gateway controller for a request to acquire IP addresses of a gateway and a VM host.

DESCRIPTION OF EMBODIMENTS

In a case in which resources are deployed across islands or across AZs, it is unknown in which island or AZ network equipment that is a setting target exists. Therefore, an administrator of an information processing system performs a task of changing settings on the network equipment. Since settings on the network equipment are frequently changed, a heavy load is imposed on the administrator of the system.

Figure 2:
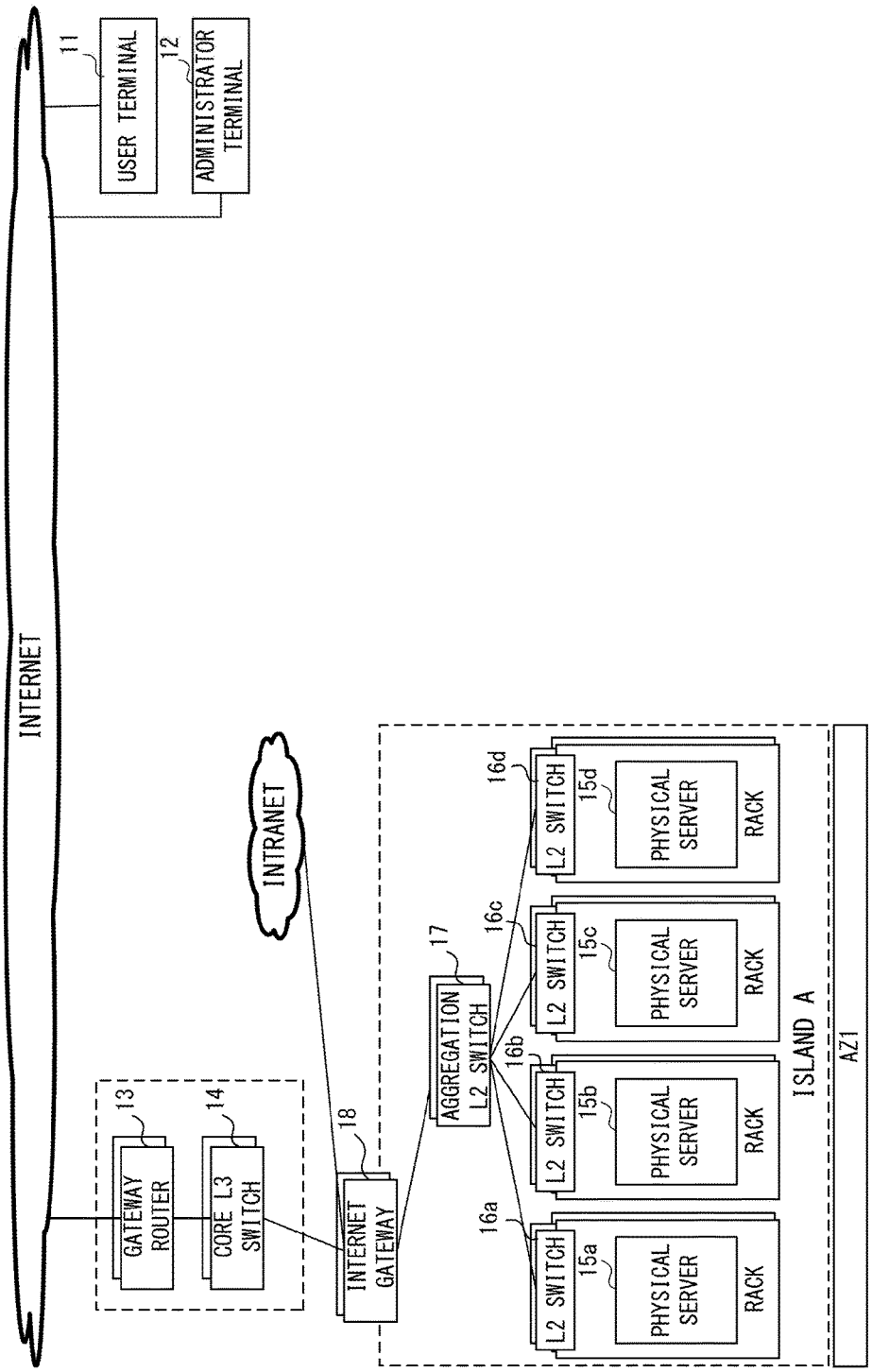
FIG. 2 illustrates an example of the configuration of the information processing system in a case in which resources are deployed within one island.

FIG. 2 illustrates an example of the configuration of the information processing system in a case in which resources are deployed within one island.

In FIG. 2, AZ1 includes island A. Island A includes the information processing system. In the information processing system, one or more resources that are provided to one or more users are deployed. A user terminal 11 accesses resources of island A via the Internet. Thus, the user terminal 11 uses some of the resources of the information processing system that are allocated to the user. An administrator terminal 12 accesses the system of island A via the Internet. Thus, an operation administrator manages the information processing system. That is, the operation administrator changes the configuration or settings of the information processing system according to a request from the user to change the form of resource use. Thus, the operation administrator changes allocation of resources according to a request from the user.

The information processing system of island A connects to the Internet via a gateway router 13 and a core L3 (layer 3) switch 14. In addition, the information processing system connects to an intranet. Note that the gateway router 13 and the core L3 switch 14 belong to another network that is outside the information processing system of island A.

The information processing system includes one or more physical servers 15 and L2 (layer 2) switches 16 that are included in a server rack or server racks, an aggregation L2 switch 17, and an Internet gateway 18 (hereinafter referred to as a gateway 18).

The physical server 15 is an information processing device for operating a virtual machine (VM) host as an operating system (OS) for operating a virtual machine. The L2 switches 16 (16a-16d) relay communications between the physical servers 15 (15a-15d) and the aggregation L2 switch 17. The aggregation L2 switch 17 relays communications between each L2 switch 16 and the gateway 18. The gateway 18 connects the network of island A to another network whose protocol is different from that of the network of island A. That is, the gateway 18 connects the network of island A to the Internet and the intranet. Specifically, the gateway 18 relays communications between the aggregation L2 switch 17 and the core L3 switch 14. The gateway 18 may convert the protocol of the network of island A into the protocol of the external network and vice versa with respect to data to be communicated. Note that on the physical server 15, a hypervisor may run in lieu of the VM host.

Figure 3:
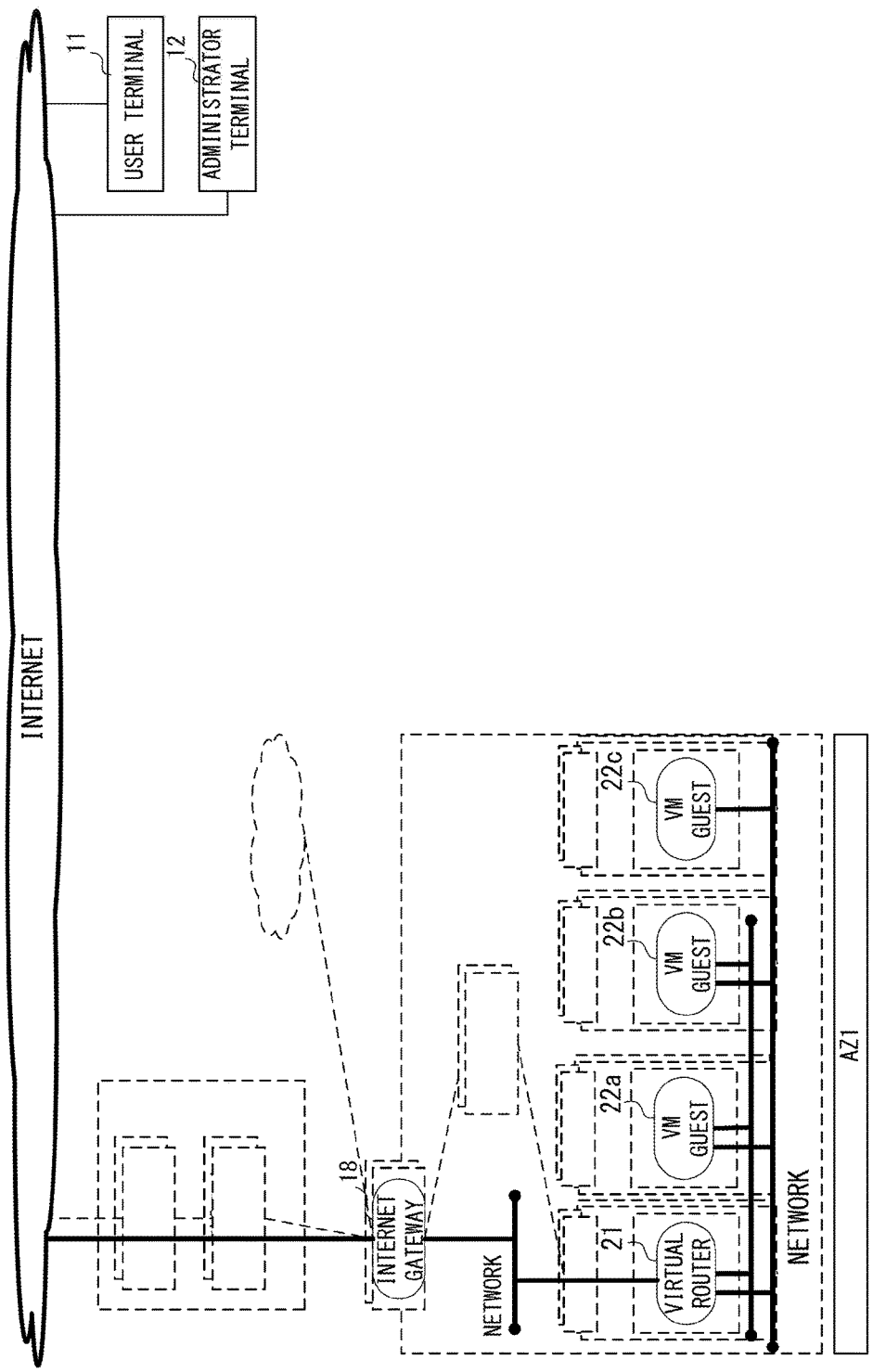
FIG. 3 is an example (Part 1) of resources that are allocated to a user.

FIG. 3 is an example of resources that are allocated to a user in the information processing system in which resources are deployed within one island.

In FIG. 3, in the information processing system of island A, some or all of the resources of VM guests 22 (22a-22c), a virtual router 21, and the gateway 18 are allocated to the user. The VM guest 22 is a virtual machine that runs on the VM host. The virtual router 21 is software that virtually provides an L3 routing function and manages network resources that are allocated to the user. That is, the virtual router 21 provides, for example, a routing function for controlling communication between the user terminal 11 and the VM guest 22. The virtual router 21 runs on the VM host. The gateway 18 relays communications between the virtual router 21 and the Internet, and provides a routing function for controlling communications between the Internet and the virtual router 21.

Settings on the gateway 18 and the virtual router 21 are configured so that it seems to the user that a global IP is set for the VM guest 22.

FIG. 4 is an explanatory diagram of the network equipment that is a target for a setting change in a case of changing the network configuration of the system that is provided to the user in the information processing system in which resources are deployed within one island. An example of the case of changing the network configuration of the system that is provided to the user is a case of newly allocating a global IP to the VM guest 22 in FIG. 3 or deleting the global IP from the VM guest 22. In this case, as illustrated in FIG. 4, the virtual router 21, the gateway 18, the core L3 switch 14, and the gateway router 13 are targets for the setting change.

As illustrated in FIG. 4, the operation administrator does not need to manually change settings on the virtual router 21 and the gateway 18. It is possible for the virtual router 21 and the gateway 18 to automatically detect changes in the network configuration and to set routing, etc. In contrast, the operation administrator manually changes settings on the core L3 switch 14 and the gateway router 13. Specifically, the operation administrator configures routing settings such as static route settings on the core L3 switch 14, and configures settings for notifying an external network of the global IP on gateway router 13.

FIG. 5 illustrates an example of the configuration of the information processing system in a case in which resources are deployed across a plurality of islands.

In FIG. 5, island A and island B are included in AZ1, and island C is included in AZ2. One information processing system is configured by including resources of islands A, B and C. That is, one or more islands may be included in the information processing system. It is possible for the information processing system to deploy resources to be provided to the user. In addition, it is possible for the information processing system to deploy resources to be provided to the user across a plurality of islands.

Islands A and B connect to the Internet via a gateway router 13a and a core L3 switch 14a. Island C connects to the Internet via a gateway router 13d and a core L3 switch 14c. Each of Islands A, B, and C connects to another external network via a core L3 switch 14b and a gateway router 13b or 13c. Note that the core L3 switch 14b is connected to a route reflector 10. The route reflector 10 is a router for reducing the load of a router that uses, for example, a dynamic communication control protocol.

Island A includes one or more physical servers (VM hosts) and L2 switches 16a-16d that are included in server racks, an aggregation L2 switch 17a, and gateways 18a and 18b. Island B includes one or more physical servers and L2 switches 16e and 16f that are included in server racks, an aggregation L2 switch 17b, and gateways 18c and 18d. Island C includes one or more physical servers and L2 switches 16g and 16h that are included in server racks, an aggregation L2 switch 17c, and gateways 18e and 18f. The VM host runs on each physical server.

The physical server, the L2 switch 16, the aggregation L2 switch 17, and the gateway 18 are the same as the physical server 15, the L2 switch 16, the aggregation L2 switch 17, and the gateway 18 illustrated in FIG. 2.

A portal 19 is an information processing device that receives a change request to the network equipment from the user terminal. Note that each piece of the network equipment illustrated in FIG. 5 may be made redundant.

Figure 6:
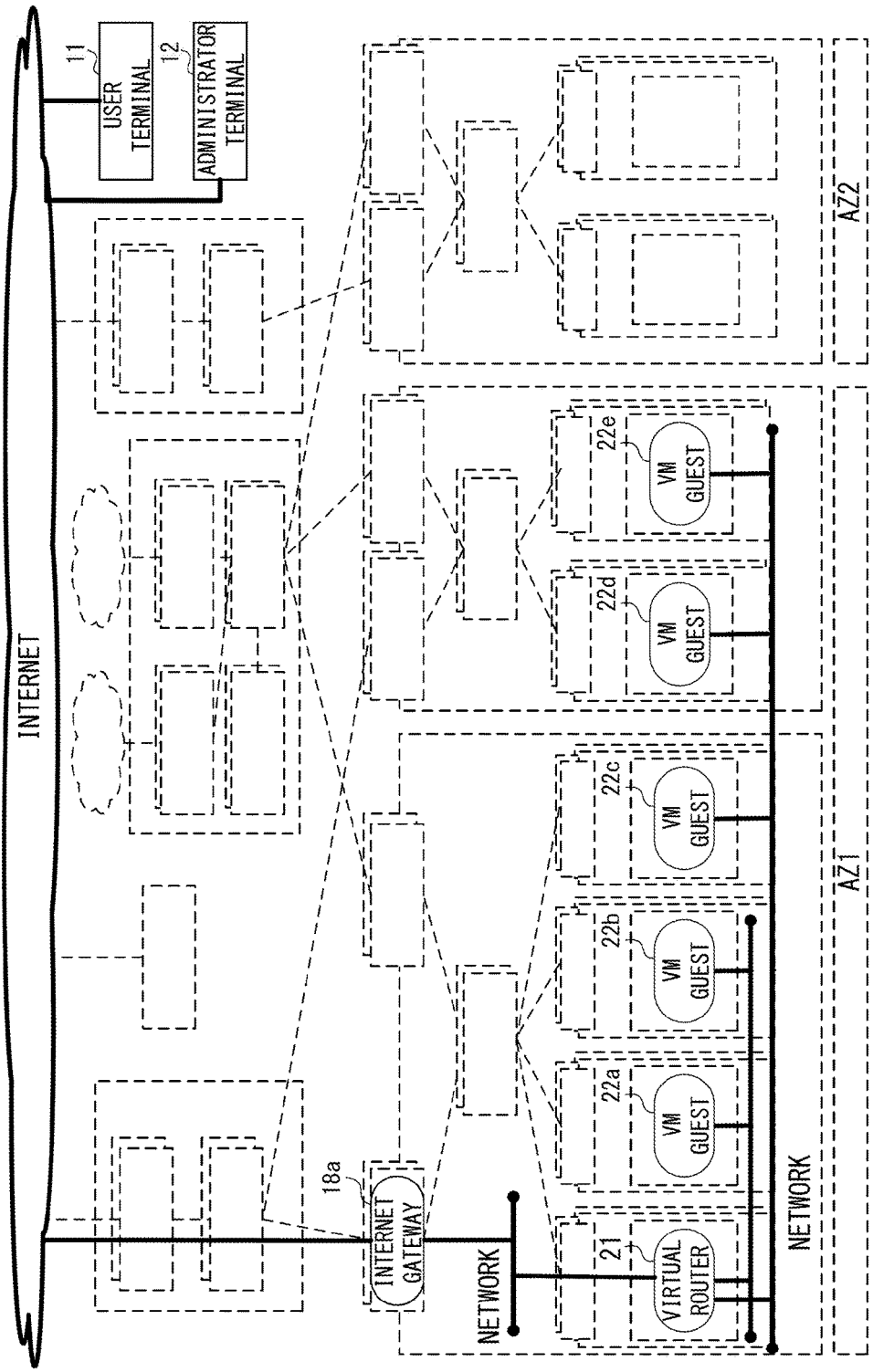
FIG. 6 is an example (Part 2) of resources that are allocated to the user.

FIG. 6 is an example of resources that are allocated to the user in the information processing system in which resources are deployed across a plurality of islands. In comparison with FIG. 3, in FIG. 6, resources are deployed in islands A and B.

In FIG. 6, in islands A and B, some or all of the resources of VM guests 22 (22a-22e), the virtual router 21, and the gateway 18a are allocated to the user. The functions of the VM guests 22, the virtual router 21, and the gateway 18a are the same as the functions illustrated in FIG. 3.

FIG. 7 is an explanatory diagram of the network equipment that is a target for a settings change in a case in which the network configuration of the system that is provided to the user is changed in the information processing system in which resources are deployed across a plurality of islands. In the description of FIG. 7, an example of the case of newly allocating a global IP to the VM guest 22 in FIG. 6 will be described.

In FIG. 4, it is possible for the virtual router 21 and the gateway 18 to automatically detect a change in the network configuration and to set routing, etc. Automatic setting is possible in this manner because the island in which resources that are allocated to the user are deployed is identified in advance and the models of the virtual router 21 and the gateway 18 that are setting targets are identified in advance.

In contrast, in FIG. 7, it is possible to deploy resources in all the islands A, B and C. That is, there is a possibility that the target VM guest 22 exists in one of the islands A, B and C. In addition, as illustrated in FIG. 6, in a case in which it is possible to deploy resources across a plurality of islands, there are cases in which the virtual router 21 in island A manages routing for the VM guest 22 in island B. Therefore, there is a possibility that the virtual router 21 that manages routing for the target VM guest 22 exists in one of islands A, B and C, and the virtual router 21 to which a setting change is to be performed will not be identified in advance. In addition, there are cases in which the models of the network equipment that exist in each island differ from each other.

Therefore, in the information processing system in which it is possible to deploy resources across a plurality of islands as illustrated in FIG. 7, the operation administrator changes settings on the virtual router 21 and the gateway 18 as well as settings on the core L3 switch 14 and the gateway router 13. Thus, when the operation administrator is involved in changing of settings on more pieces of the network equipment, it is not possible to develop a service seamlessly, and it is more likely that communication interruption due to human error of the operation administrator will occur.

Figure 8:
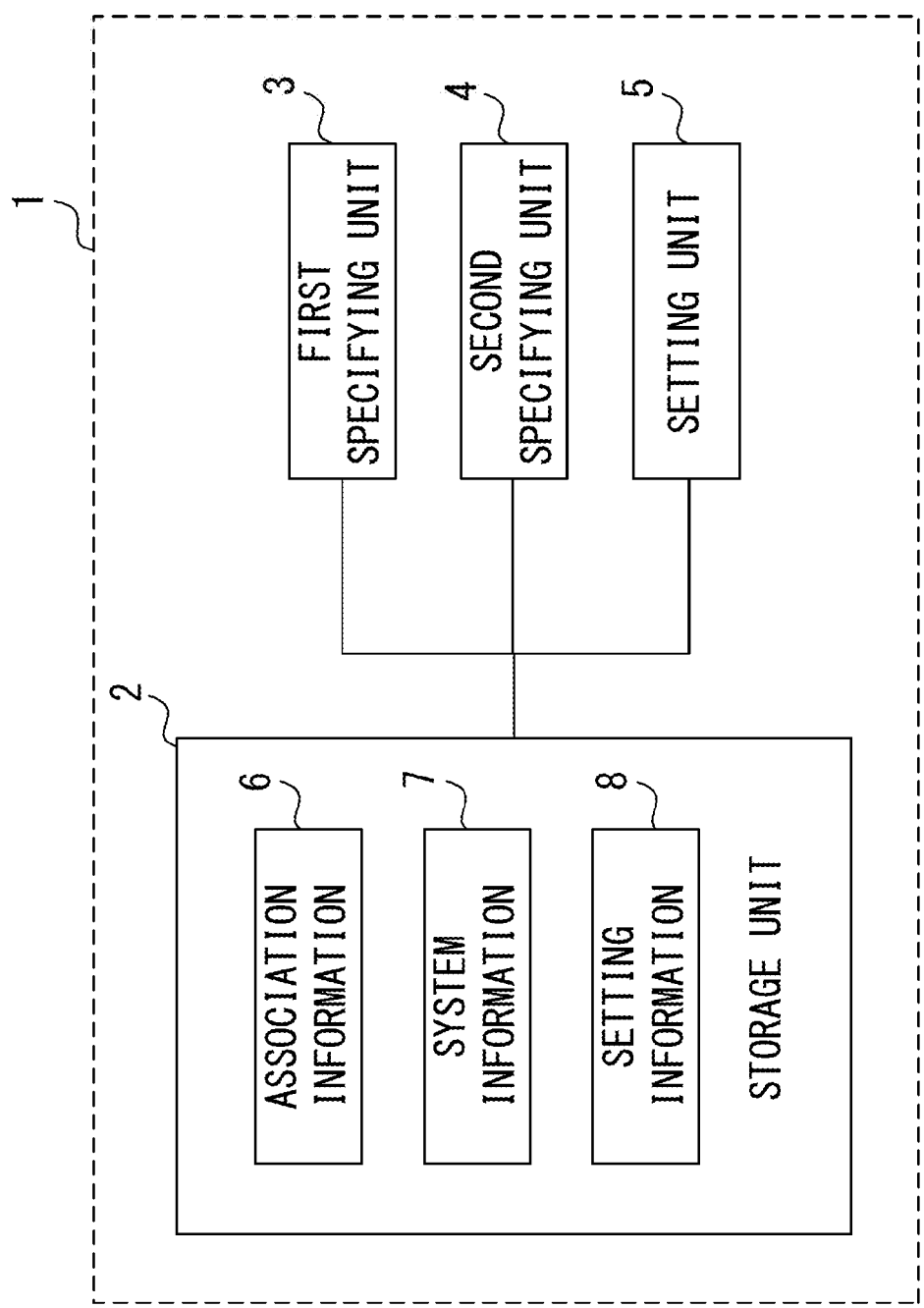
FIG. 8 illustrates an example of the functional block diagram of the information processing system according to an embodiment.

FIG. 8 illustrates an example of the functional block diagram of an information processing system 1 according to an embodiment. In FIG. 8, the information processing system 1 includes a storage unit 2, a first specifying unit 3, a second specifying unit 4, and a setting unit 5.

The storage unit 2 stores association information 6 that is obtained by associating identifying information of a plurality of second communication networks that are interconnected via a first communication network with identifying information of a virtual device that exists in the second communication network.

The first specifying unit 3 specifies according to the association information the second communication network in which the target virtual device exists in a case in which the first specifying unit 3 acquires a request for a setting change to the target virtual device.

The second specifying unit 4 specifies the physical server on which the target virtual device runs from among physical servers that exist in the specified second communication network.

The setting unit 5 performs the setting change to the target virtual device that runs on the specified physical server.

An example of the first communication network is the Internet. Examples of the second communication networks are networks within the same island. An example of the virtual device is a virtual router.

Thus, it is possible for the information processing system 1 to specify in which network from among the plurality of second communication networks the virtual device that is a target for the setting change exists. Thus, in the information processing system 1, it is possible to change settings on the network equipment between the plurality of second communication networks that are interconnected via the first communication network.

In addition, since it is possible for the information processing system 1 to specify the location of the virtual device that is a target for a setting change, it is possible to automatically change settings on the network equipment. Thus, in the information processing system in which resources are deployed across a plurality of islands, it is possible to reduce the load that is imposed on the operation administrator in a case in which there is a request for a setting change to the network equipment.

In addition, the storage unit 2 stores system information 7 that is obtained by associating identifying information of a virtual server that exists in the second communication network with identifying information of the virtual device that exists in the same second communication network as that in which the virtual server exists. In addition, in a case in which the first specifying unit 3 receives a connection request to the virtual server, the first specifying unit 3 acquires according to the system information 7 identifying information of the virtual device that corresponds to the virtual server. Then, the first specifying unit 3 specifies the second communication network in which the virtual device exists according to the acquired identifying information of the virtual device and the association information 6. In addition, the setting unit 5 performs a setting change of route control for connecting the virtual server to the first communication network, the setting change being performed to the target virtual device and the gateway for connecting the specified second communication network to the first communication network.

Thus, it is possible for the information processing system 1 to specify the setting-target virtual device for connecting the virtual server to the first communication network from among a plurality of virtual devices that exist in the plurality of second communication networks. In addition, it is possible for the information processing system 1 to interconnect the virtual server and the first communication network by configuring settings on the gateway that interconnect the second communication network in which the virtual server exists and the first communication network.

In addition, the storage unit 2 further stores setting information 8 that is obtained by associating information that indicates the model of the gateway for each of the plurality of second communication networks with information that indicates the setting content according to the model. In addition, according to the setting information 8, the setting unit 5 configures settings according to the model of the gateway that interconnects the specified second communication network and another network.

Thus, it is possible for the information processing system 1 to appropriately configure settings on the gateway according to the model of the gateway for each second communication network.

In addition, the setting unit 5 sets a protocol for dynamically exchanging route information between the target virtual device and the gateway, the protocol being set for the target virtual device and the gateway that interconnects the specified second communication network and another network.

Thus, in the information processing system 1, in a case in which settings on the virtual device have been changed, the gateway is automatically notified of the content of the change in settings. Therefore, it is possible to reduce the load that is imposed on the administrator of the information processing system 1 in a case in which settings on the virtual device have been changed.

Figure 9:
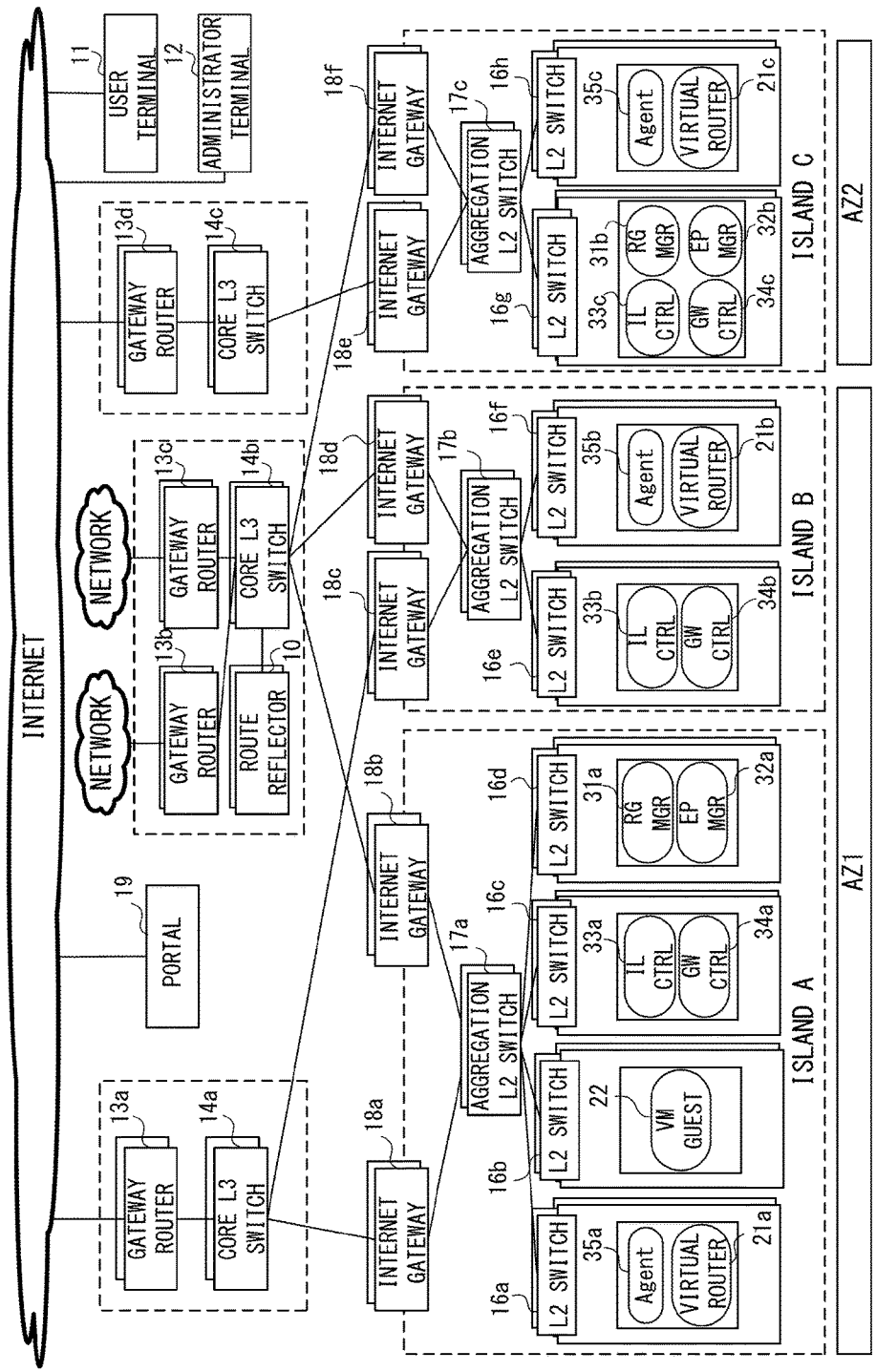
FIG. 9 illustrates an example of the configuration of the information processing system according to the embodiment.

FIG. 9 illustrates an example of the configuration of the information processing system according to the embodiment. The hardware configuration of the information processing system according to the embodiment is the same as the configuration illustrated in FIG. 5 except that a dynamic route control protocol is set among the gateway router 13, the core L3 switch 14, and the gateway 18. An example of the dynamic route control protocol is Border Gateway Protocol (BGP). It is possible to dynamically exchange route information between pieces of the network equipment on which the dynamic route control protocol runs.

In the information processing system in FIG. 9, a region manager 31 (31a, 31b) (referred to as RGMGR in FIG. 9) and an end-point manager 32 (32a, 32b) (referred to as EPMGR in FIG. 9) are included in one VM host in each AZ. In addition, an island controller 33 (33a-33c) (referred to as ILCTRL in FIG. 9) and a gateway controller 34 (34a-34c) (referred to as GWCTRL in FIG. 9) are included in one VM host in each island. Furthermore, an agent 35 (35a-35c) (referred to as Agent in FIG. 9) is included in the VM host in which the virtual router 21 (21a-21c) exists. In the following description, it is assumed that the term "controller" indicates both the island controller 33 and the gateway controller 34. Note that each VM host runs on each physical server 15 as described above. In addition, one or a specified combination of the region manager 31, the end-point manager 32, the island controller 33, the gateway controller 34, and the agent 35 may run on one VM host (physical server).

The region manager 31 and the gateway controller 34 provide some or all of the functions of the storage unit 2, the first specifying unit 3, the second specifying unit 4, and the setting unit 5.

Hereinafter, details of the region manager 31, the end-point manager 32, the island controller 33, the gateway controller 34, and the agent 35 will be described in this order.

The region manager 31 manages the hardware configuration of the information processing system. In addition, the region manager 31 receives a request to change the network configuration from the user and controls a setting change process of the network equipment.

The region manager 31 has a region manager database (hereinafter referred to as an RMDB) and model information. Information of the virtual router 21 that is included in the information processing system is stored in the RMDB. The model information contains information that indicates the model of the gateway 18 that exists in each island and information that indicates the setting content that corresponds to each model. The RMDB and the model information are stored in a specified storage area of the physical server on which the region manager 31 runs. The RMDB is an example of the association information 6. The model information is an example of the setting information 8.

FIG. 10 illustrates an example of the configuration of the RMDB. In FIG. 10, data items "UUID", "AZ" and "island" are contained in the RMDB, and each data item is associated with the others for each record. "UUID" is information that indicates a universal unique identifier (UUID) of the virtual router 21. "AZ" is identifying information of the AZ to which the virtual router 21 that is indicated by the corresponding "UUID" belongs. "Island" is identifying information of the island to which the virtual router 21 that is indicated by the corresponding "UUID" belongs.

FIG. 11 illustrates an example of the model information. In FIG. 11, data items "AZ", "island", "model" and "setting content" are contained in the model information, and each data item is associated with the others for each record. "AZ" is identifying information of an AZ. "Island" is identifying information of an island. "Model" is information that indicates the model of the network equipment that exists in the location that is indicated by "AZ" and "island". Specifically, "model" is information that indicates the model of, for example, the gateway 18. "Setting content" is information that indicates the setting content with respect to the model of the network equipment that is indicated by "model".

The end-point manager 32 manages information of the controller that is included in each island. An end-point manager database (hereinafter referred to as an EMDB) is included in the end-point manager 32. Information of the controller for each island is stored in the EMDB. The EMDB is stored in a specified storage area of the physical server on which the end-point manager 32 runs.

FIG. 12 illustrates an example of the configuration of the EMDB. In FIG. 12, data items "controller", "AZ", "island" and "type" are contained in the EMDB. Each data item is associated with the others for each record. "Controller" is information that indicates the IP address of a controller. "AZ" is identifying information of an AZ. "Island" is identifying information of an island. "Type" is information that indicates the type of "controller" (whether it is the island controller 33 or the gateway controller 34).

The island controller 33 manages information of the virtual router 21 and the gateway 18 that are included in the island to which the island controller 33 itself belongs. An island controller database (hereinafter referred to as an ICBD) is included in the island controller 33. The ICDB is stored in the specified storage area of the physical server on which the island controller 33 runs. Router information and network information are contained in the ICDB. The router information contains information of the virtual router 21 and the gateway 18 that are included in the island to which the island controller belongs. The network information contains information of the network of the island to which the island controller 33 belongs. The network information is an example of the system information 7. Note that the network information may be contained in the RMDB.

FIG. 13 illustrates an example of the configuration of the router information. In FIG. 13, data items "virtual router", "gateway IP" and "AZ" are contained in the router information. Each data item is associated with the others for each record. "Virtual router" is information that indicates the UUID of the virtual router 21 that is included in the island to which the island controller 33 belongs. "Gateway IP" is information that indicates the IP address of the gateway 18 that is included in the island to which the island controller 33 belongs. "AZ" is identifying information of the AZ that includes the island to which the island controller 33 belongs.

FIG. 14 illustrates an example of the configuration of the network information. In FIG. 14, data items "network", "port" and "virtual router/VM" are contained in the network information, and each data item is associated with the others for each record. "Network" is identifying information of the network that is included in the island to which the controller belongs. Note that the network may be a virtual network. "Port" is information that indicates whether a device that has a port that is connected to the corresponding "network" is the VM guest 22 or the virtual router 21. "Virtual router/VM" is the UUID of the virtual router 21 or the VM guest 22 that is connected to the corresponding "network".

The gateway controller 34 manages the configurations of the gateway 18 and the virtual router 21 that are included in the island. A gateway controller database (hereinafter referred to as a GCDB) is included in the gateway controller 34. The GCDB is stored in a specified storage area of the physical server on which the gateway controller 34 runs. Gateway information and VM host information are contained in the GCDB. The gateway information is information for managing the AZ and the island in which the gateway 18 is included. The VM host information is information for managing the AZ and the island in which the VM host is included.

FIG. 15 illustrates an example of the configuration of the gateway information. In FIG. 15, data items "gateway", "AZ", and "island" are contained in the gateway information. Each data item is associated with the others for each record. "Gateway" is information that indicates the IP address of the gateway 18. "AZ" is identifying information of an AZ. "Island" is identifying information of an island.

FIG. 16 illustrates an example of the configuration of the VM host information. In FIG. 16, data items "VM host IP", "host name", "AZ", and "island" are contained in the VM host information. Each data item is associated with the others for each record. "VM host IP" is information that indicates the IP address of a VM host. "Host name" is information that indicates the identifying information (host name) of the VM host that has the IP address that is indicated by the corresponding "VM host IP". "AZ" is identifying information of the AZ to which the VM host that is indicated by the corresponding "host name" belongs. "Island" is identifying information of the island to which the VM host that is indicated by the corresponding "host name" belongs.

The agent 35 runs on the VM host on which the virtual router 21 runs. The agent 35 manages information of the virtual router 21. Specifically, in response to a request from the region manager 31, the agent 35 returns the host name of the VM host on which the agent 35 itself runs.

Next, the setting change process of the network equipment according to the embodiment will be described. Specifically, the setting change process of the network equipment is composed of an Internet-connection application process, a global-IP allocation process, a global-IP allocation cancellation process, and an Internet-connection cancellation application process. The Internet-connection application process and the global-IP allocation process are processes for connecting the VM guest 22 that is deployed in the information processing system to the Internet. The global-IP allocation cancellation process and the Internet-connection cancellation application process are processes for cancelling the Internet connection of the VM guest 22 that is deployed in the information processing system. The respective processes will be described hereinafter in order.

(Internet Connection Application Process)

The internet-connection application process constitutes part of a setting process of the network equipment for connecting the VM guest 22 to the Internet. When the global-IP allocation process, which will be described later, is performed after the internet-connection application process, the VM guest 22 is allowed to connect to the Internet.

The internet-connection application process is performed in a case in which the user newly applies for Internet connection of the VM guest 22. In the Internet-connection application process, settings are configured on the virtual router 21, the gateway 18, the core L3 switch 14, and the gateway router 13. Details of the Internet-connection application process will be described with reference to FIGS. 17-21.

In the embodiment, in the Internet-connection application process, the region manager 31, the end-point manager 32, the island controller 33, the gateway controller 34, and the agent 35 operate simultaneously and execute the process. Hereinafter, the respective processes will be described in order.

FIG. 17 is an example of the flowchart illustrating details of the Internet-connection application process of the region manager 31. As a process before the start of the flow in FIG. 17, first, the user terminal 11 transmits to the portal 19 an Internet-connection application with respect to the VM guest 22 that is a target for the connection application. The portal 19, which has received the Internet-connection application, transmits the Internet-connection application to one of the one or more region managers 31 that are included in the information processing system. Here, it is assumed that the Internet-connection application that has been transmitted contains the UUID of the VM host on which the target VM guest 22 runs and the UUID of the virtual router 21 that belongs to the same network (island) that the target VM guest 22 belongs to (hereinafter referred to as a target virtual router 21).

In FIG. 17, when receiving the Internet-connection application from the portal 19 (S101), the region manager 31 transmits a controller-information acquisition request to the end-point manager 32 that belongs to the same AZ that the region manager 31 belongs to (S102).

Next, the region manager 31 receives from the end-point manager 32 controller information as a return to the acquisition request (S103). Here, the received controller information contains IP addresses of all the controllers that are included in the information processing system and identifying information of the island and the AZ to which each controller belongs.

Next, the region manager 31 specifies the island and the AZ to which the target virtual router 21 belongs (S104). Specifically, the region manager 31 refers to the RMDB and acquires the identifying information of the island and the AZ to which the target virtual router 21 belongs.

Next, the region manager 31 judges whether or not the region manager 31 has acquired in S104 the identifying information of the island and the AZ to which the target virtual router 21 belongs (S105). Here, a case in which the region manager 31 cannot acquire the identifying information of the island and the AZ to which the target virtual router 21 belongs is a case in which there are no records that have the UUID of the target virtual router 21 in the RMDB. In a case in which it has been judged that the region manager 31 has acquired the identifying information of the island and the AZ to which the target virtual router 21 belongs (Yes in S105), the process transitions to S109.

In contrast, in a case in which it has been judged that the region manager 31 was not able to acquire the identifying information of the island and the AZ to which the target virtual router 21 belongs (No in S105), the following process will be performed. That is, the region manager 31 transmits a request to check an existence of the UUID of the target virtual router 21 to all the island controllers 33 that are included in the information processing system (S106). That is, the region manager 31 transmits the existence check request across islands. Here, the transmitted existence check request contains the information of the UUID of the target virtual router 21. The island controller 33 that has received the existence check request checks whether or not the target virtual router 21 exists in the island to which the island controller 33 itself belongs and returns the check result.

Then, the region manager 31 receives from each island controller 33 the check result for the existence check request. The check result that has been received from the island controller 33 contains information that indicates whether or not the target virtual router 21 exists in the island to which the island controller 33 itself belongs. By referring to the check result, the region manager 31 specifies the island controller 33 that is included in the island in which the target virtual router 21 exists. Then, the region manager 31 refers to the EMDB and specifies the AZ and the island in which the specified island controller 33 is included (S107). Thus, it is possible for the region manager 31 to specify the island and the AZ in which the target virtual router 21 exists from among the plurality of islands and AZs that are included in the information processing system.

Then, the region manager 31 associates the target virtual router 21 with the AZ and the island that have been specified in S107 and stores them in the RMDB (S108).

Next, the region manager 31 transmits a request to acquire the VM host name to each agent 35 that is included in the AZ and the island that have been specified in S104 or S107 (S109). The request to acquire the VM host name contains information of the UUID of the target virtual router 21. The agent 35 that has received the request to acquire the VM host name judges whether or not the target virtual router 21 runs on the VM host on which the agent 35 itself runs, and returns to the region manager 31 the judgment result together with the host name of the VM host on which the agent 35 itself runs. By receiving the return, the region manager 31 acquires the host name of the VM host on which the target virtual router 21 runs (S110).

Next, the region manager 31 transmits a request to acquire the IP addresses of the gateway 18 and the VM host to the gateway controller 34 that is included in the AZ and the island that have been specified in S104 or S107 (S111). The request to acquire the IP addresses of the gateway 18 and the VM host contains the identifying information of the AZ and the island that have been specified in S104 or S107 and the information of the host name that has been acquired in S110. The gateway controller 34 that has received the acquisition request refers to the GCDB, acquires the IP address of the gateway 18 and the IP address of the VM host, and returns the IP addresses to the region manager 31. By receiving this return, the region manager 31 acquires information of the IP address of the gateway 18 that is included in the island to which the target virtual router 21 belongs and information of the IP address of the VM host on which the target virtual router 21 runs (S112).

Next, the region manager 31 instructs the gateway controller 34 to perform a setting process of the virtual router 21 (S113). The gateway controller 34 that is the instruction destination is the gateway controller 34 that belongs to the island in which the target virtual router 21 exists. The instructions for settings on the virtual router 21 contain the information of the IP address of the gateway 18 and the information of the IP address of the VM host on which the target virtual router 21 runs, which have been acquired in S112.

In the setting process of the virtual router 21, the gateway controller 34 sets the dynamic route control protocol and routing for the target virtual router 21 so that it is possible for the target VM guest 22 to connect to the Internet. At that time, the gateway controller 34 logs in the VM host on which the target virtual router 21 runs by using the IP address of the VM host that is contained in the instructions for settings on the virtual router 21, and performs the setting process of the virtual router 21. Specifically, for example, the gateway controller 34 connects to the VM host by using Teletype Network (telnet) or Secure Shell (ssh) and performs the setting process.

In the setting of the dynamic route control protocol, for example, the BGP is set. In the setting of the BGP, the IP address of the gateway 18 that is contained in the instructions for the settings on the virtual router 21 is set as the IP address of a neighbor router (peer) with which the virtual router 21 exchanges route information.

Next, the region manager 31 instructs the gateway controller 34 to perform a setting process of the gateway 18 (S114). The gateway controller 34 that is the instruction destination is the gateway controller 34 that belongs to the island in which the target virtual router 21 exists. The instructions for settings on the gateway 18 contain information of the IP address of the gateway 18 and the information of the IP address of the VM host on which the target virtual router 21 runs, which have been acquired in S112.

Before giving the instructions for the setting process of the virtual router 21, the region manager 31 refers to the model information and acquires the model of the gateway that belongs to the island in which the target virtual router 21 exists and the setting content that corresponds to the model. Then, the region manager causes the instructions for the setting process to contain the information that indicates the acquired model of the gateway and the information that indicates the setting content that corresponds to the model and transmits the instruction to the gateway controller 34.

In the setting process of the gateway 18, the gateway controller 34 sets a dynamic route conversion protocol so that the target VM guest is allowed to connect to the Internet.

At that time, the gateway controller 34 connects to the gateway 18 by using the IP address of the gateway 18 that is contained in the instructions for settings on the gateway 18 and performs the setting process. In addition, the gateway controller 34 configures settings on the gateway 18 according to the information that indicates the model of the gateway 18 and the setting content that corresponds to the model, the information and the setting content being contained in the instructions for the setting process.

In the setting of the dynamic route control protocol, for example, the BGP is set. In the setting of the BGP, the IP address of the VM host that is contained in the instructions for the settings on the gateway 18 is set as the IP address of a neighbor router (peer) with which route information are exchanged.

Here, the dynamic route control protocol is set in advance among the gateway router 13, the core L3 switch 14, and the gateway 18. Therefore, when the setting process of the gateway 18 has been completed in S114, the core L3 switch 14 and the gateway 18 are automatically notified of the content that has been changed in the setting process, and the changed content is reflected in the setting content of each of them.

Then, the process is terminated.

Next, the Internet-connection application process of the end-point manager 32 will be described. The end-point manager 32 performs a response process for the controller-information acquisition request in the Internet-connection application process. In this process, the end-point manager 32 returns the IP addresses of all the controllers that are included in the information processing system and the information of the AZ and the island in which the controller is included.

Figure 18:
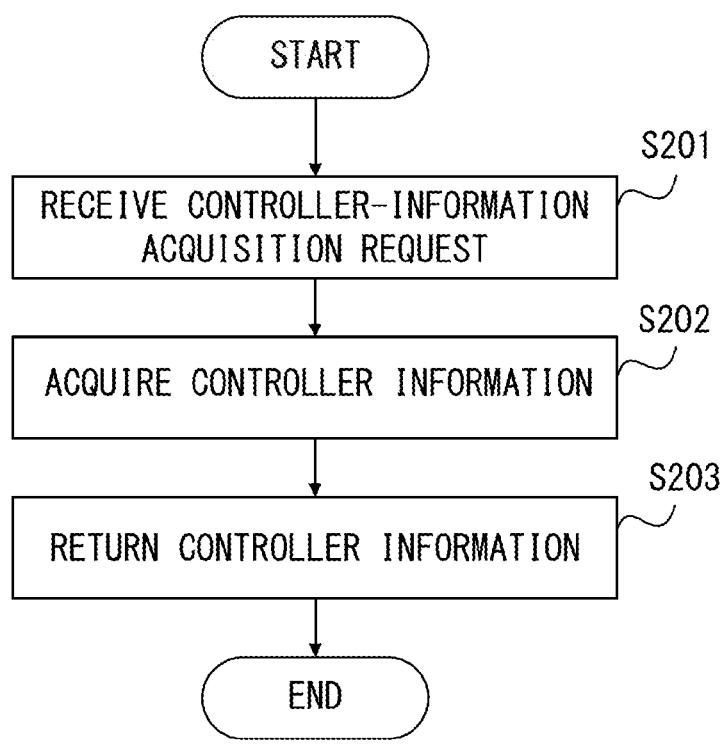
FIG. 18 is an example of the flowchart illustrating details of the response process of an end-point manager for a controller-information acquisition request.

FIG. 18 is an example of the flowchart illustrating details of the response process of the end-point manager 32 for the controller-information acquisition request. In FIG. 18, the end-point manager 32 receives the controller-information acquisition request from the region manager 31 (S201). Note that the controller-information acquisition request that has been received here is the request that has been transmitted from the region manager 31 in S102 in FIG. 17.

Next, the end-point manager 32 refers to the EMDB and acquires controller information (S202). The controller information is information of all the records that are stored in the EMDB.

Next, the end-point manager 32 returns to the region manager 31 the controller information that has been acquired in S202 (S203). Then, the process is terminated.

Next, the Internet-connection application process of the island controller 33 will be described. In the Internet-connection application process, the island controller 33 performs a response process for the request to check for the existence of the UUID of the virtual router 21. In this process, the island controller 33 returns information that indicates whether or not the target virtual router 21 is included in the island to which the island controller 33 itself belongs.

Figure 19:
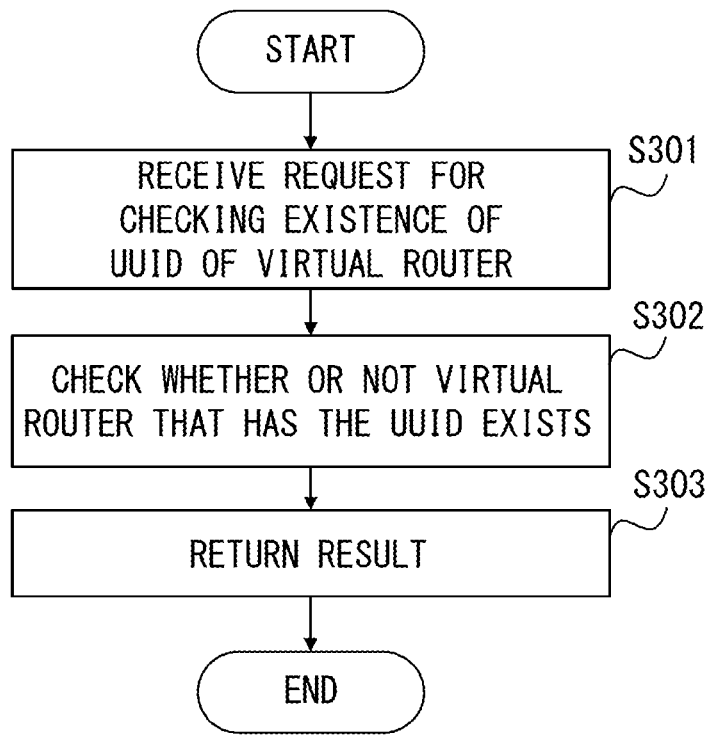
FIG. 19 is an example of the flowchart illustrating details of the response process of an island controller for a request to check for the existence of the UUID of a virtual router.

FIG. 19 is an example of the flowchart illustrating details of the response process of the island controller 33 for the request to check for the existence of the UUID of the virtual router 21. In FIG. 19, the island controller 33 receives from the region manager 31 the request to check for the existence of the UUID of the virtual router 21 (S301). The request to check for the existence of the UUID of the virtual router 21 contains information of the UUID of the target virtual router 21. Note that the existence check request that has been received here is the request that has been transmitted from the region manager 31 in S106 in FIG. 17.

Next, the island controller 33 refers to the ICDB and judges whether or not the target virtual router 21 exists in the island to which the island controller 33 itself (the island controller 33 that executes the process in S302) belongs (S302). Specifically, the island controller 33 checks whether or not the record exists among the records of router information in the ICDB, the record having the value of data item "virtual router" that coincides with the UUID of the target virtual router 21 that is contained in the existence check request. In a case in which such a record exists, the island controller 33 judges that the target virtual router 21 exists in the island to which the island controller 33 itself belongs.

Next, the island controller 33 returns to the region manager 31 information that indicates whether or not the target virtual router 21 exists in the island to which the island controller 33 itself belongs (S303). Then, the process is terminated.

Next, the Internet-connection application process of the agent 35 will be described. In the Internet-connection application process, the agent 35 performs a response process for the request to acquire the VM host name. In this process, the agent 35 returns information of the host name of the VM host on which the agent 35 itself runs.

FIG. 20 is an example of the flowchart illustrating details of the response process of the agent 35 for the request to acquire the VM host name. In FIG. 20, the agent 35 receives from the region manager 31 the request to acquire the VM host name (S401). The information of the UUID of the target virtual router is contained in the request to acquire the VM host name. Note that the request to acquire the VM host name that has been received here is the request that has been transmitted from the region manager 31 in S109 in FIG. 17.

Next, the agent 35 checks whether or not the target virtual router 21 runs on the VM host on which the agent 35 itself (the agent 35 that executes the process in S402) runs (S402).

Next, the agent 35 returns to the region manager 31 information of the host name of the VM host on which the agent 35 itself runs as well as information that indicates whether or not the target virtual router 21 runs on the VM host on which the agent 35 itself runs (S403). Then, the process is terminated.

Next, the Internet-connection application process of the gateway controller 34 will be described. In the Internet-connection application process, the gateway controller 34 performs a response process for the request to acquire the IP addresses of the gateway 18 and the VM host. In this process, the gateway controller 34 returns the IP address of the gateway 18 that belongs to the AZ and the island that are indicated in the acquisition request, and the IP address of the host that belongs to the AZ and the island which are indicated in the acquisition request and that has the host name that is indicated in the acquisition request.

FIG. 21 is an example of the flowchart illustrating details of the response process of the gateway controller 34 for the request to acquire the IP addresses of the gateway 18 and the VM host. In FIG. 21, the gateway controller 34 receives from the region manager 31 the request to acquire the IP addresses of the gateway 18 and the VM host (S501). In the request to acquire the IP addresses of the gateway 18 and the VM host, identifying information of the AZ and the island and information that indicates the host name are contained. Note that the request to acquire the IP addresses of the gateway 18 and the VM host that has been received here is the request that has been transmitted from the region manager 31 in S111 in FIG. 17.

Next, the gateway controller 34 refers to the GCDB and acquires the IP address of the gateway 18 and the IP address of the VM host. Specifically, the gateway controller 34 extracts from among the records of the gateway information the record that has the values of the data items "AZ" and "island" which coincide with the identifying information of the AZ and the identifying information of the island that are contained in the acquisition request which has been received in S501, respectively. Then, the gateway controller 34 acquires as the IP address of the gateway 18 the value of "gateway" of the extracted record (S502). In addition, the gateway controller 34 extracts from among the records of the VM host information the record whose values of "host name", "AZ" and "island" coincide with the identifying information of the host name, the AZ and the island that is contained in the acquisition request which has been received in S501, respectively. Then, the gateway controller 34 acquires as the IP address of the VM host the value of "VM host IP" of the extracted record (S503).

Next, the gateway controller 34 returns to the region manager 31 the IP addresses of the gateway 18 and the VM host that have been acquired in S502 and S503, respectively (S504). Then, the process is terminated.

(Global-IP Allocation Process)

The global-IP allocation process is part of the setting process for the network equipment that allows the VM guest 22 to connect to the Internet. When the global-IP allocation process is executed after the Internet-connection application process that has been described above, the VM guest 22 is allowed to connect to the Internet. In the global-IP allocation process, settings are configured on the virtual router 21, the gateway 18, the core L3 switch 14, and the gateway router 13.

The global-IP allocation process is executed in a case in which the user terminal 11 makes a global-IP allocation request to the VM guest. In the global-IP allocation process, settings are configured on the virtual router 21. Details of the global-IP allocation process will be described with reference to FIG. 22.

Figure 22:
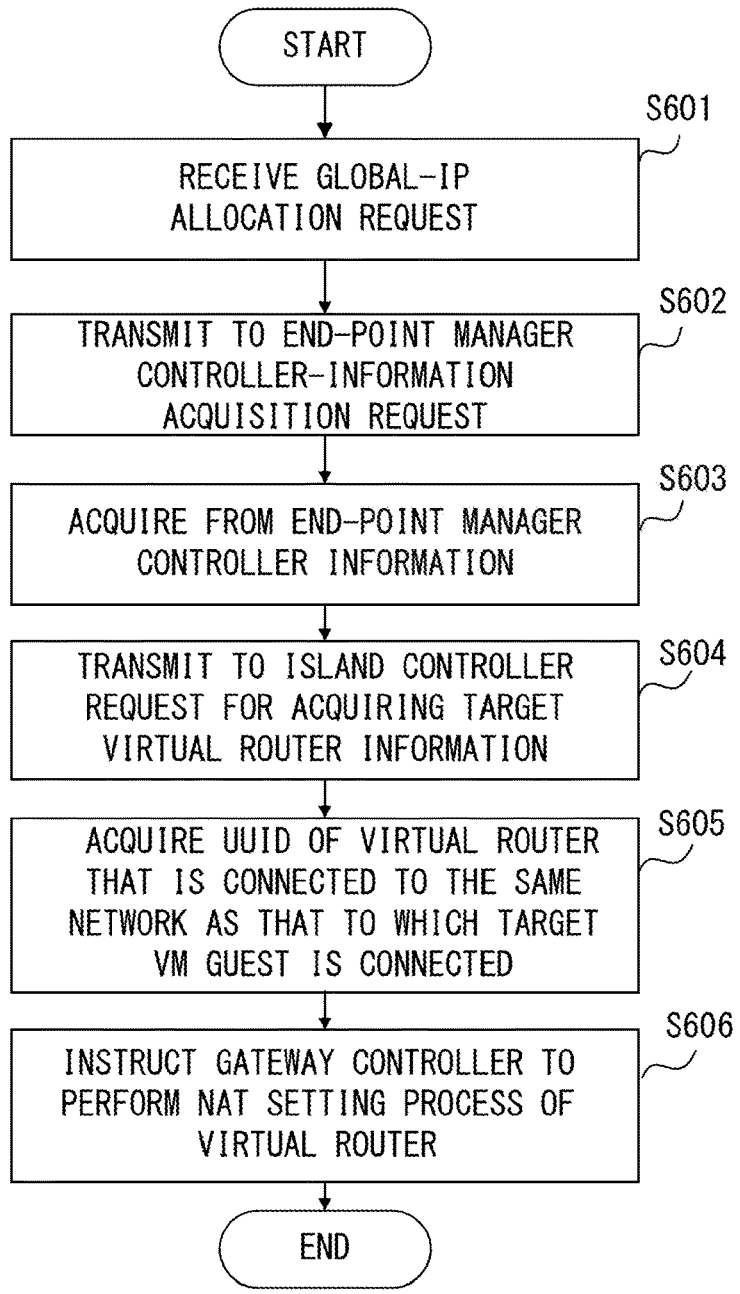
FIG. 22 is an example of the flowchart illustrating details of the global-IP allocation process of the region manager.

FIG. 22 is an example of the flowchart illustrating details of the global-IP allocation process of the region manager 31. As a process before the start of the flow in FIG. 22, first, the user terminal 11 transmits to the portal 19 a request to allocate a global IP to the target VM guest 22. The portal 19 that has received the global-IP allocation request transmits the global-IP allocation request to one of the one or more region managers 31 that are included in the information processing system. It is assumed that the UUID of the target VM guest 22 is contained in the global-IP allocation request that has been transmitted here.

In FIG. 22, when the region manager 31 receives from the portal 19 the global-IP allocation request (S601), the region manager 31 transmits a controller-information acquisition request to the end-point manager 32 that belongs to the same AZ that the region manager 31 belongs to (S602). The process of the end-point manager 32 that has received the controller-information acquisition request is the same as the process that has been described in FIG. 18.

Next, the region manager 31 receives from the end-point manager 32 controller information as a reply to the acquisition request (S603). The controller information that has been received here contains the IP addresses of all the island controllers 33 that are included in the information processing system and the identifying information of the island and the AZ to which each controller belongs.

Next, the region manager 31 transmits a request to acquire target virtual router information to all the island controllers 33 that are included in the information processing system (S604). Information of the UUID of the target VM guest 22 is contained in the request to acquire the target virtual router information that has been transmitted here. The island controller 33 that has received the request to acquire the target virtual router information refers to the network information in the ICDB and acquires the UUID of the virtual router 21 that is connected to the same (virtual) network that the target VM guest 22 is connected to. Then, the island controller 33 returns to the region manager 31 the acquired UUID of the virtual router 21. By receiving this return, the region manager 31 acquires the UUID of the virtual router 21 that is connected to the same network that the target VM guest 22 is connected to (S605).

Next, the region manager 31 instructs the gateway controller 34 to perform a Network Address Translation (NAT) process of the virtual router 21 (S606). The gateway controller 34 that is the instruction destination is the gateway controller 34 that belongs to the island in which the target virtual router 21 exists.

In the NAT setting process of the virtual router 21, the gateway controller 34 configures NAT settings on the target virtual router 21 so that the target VM guest 22 is allowed to connect to the Internet. At that time, the gateway controller 34 orders the agent 35 that runs on the same VM host on which the target virtual router 21 runs to configure the NAT settings. The agent 35 that has received the order logs in the target virtual router 21 and configures the following NAT settings. That is, the agent 35 associates the private IP address of the VM guest 22 with the global IP address. Specifically, as the NAT setting process of the virtual router 21, the agent 35 configures settings (snat) for changing information of the transmission source to the private IP address of the VM guest 22. In addition, as the NAT setting process of the virtual router 21, the agent 35 configures settings (dnat) for changing information of the transmission destination from the global IP address to the private IP address of the VM guest 22.

Then, the process is terminated. Note that the settings that have been configured on the target virtual router 21 are automatically reflected in the gateway 18, the core L3 switch 14 and the gateway router 13 for which the dynamic route control protocol is set.

Next, the global-IP allocation process of the island controller 33 will be described. In the global-IP allocation process, the island controller 33 performs a response process for the request to acquire the target virtual router information. In this process, the island controller 33 returns information that indicates the UUID of the virtual router 21 that is connected to the same network that the target VM guest 22 is connected to.

Figure 23:
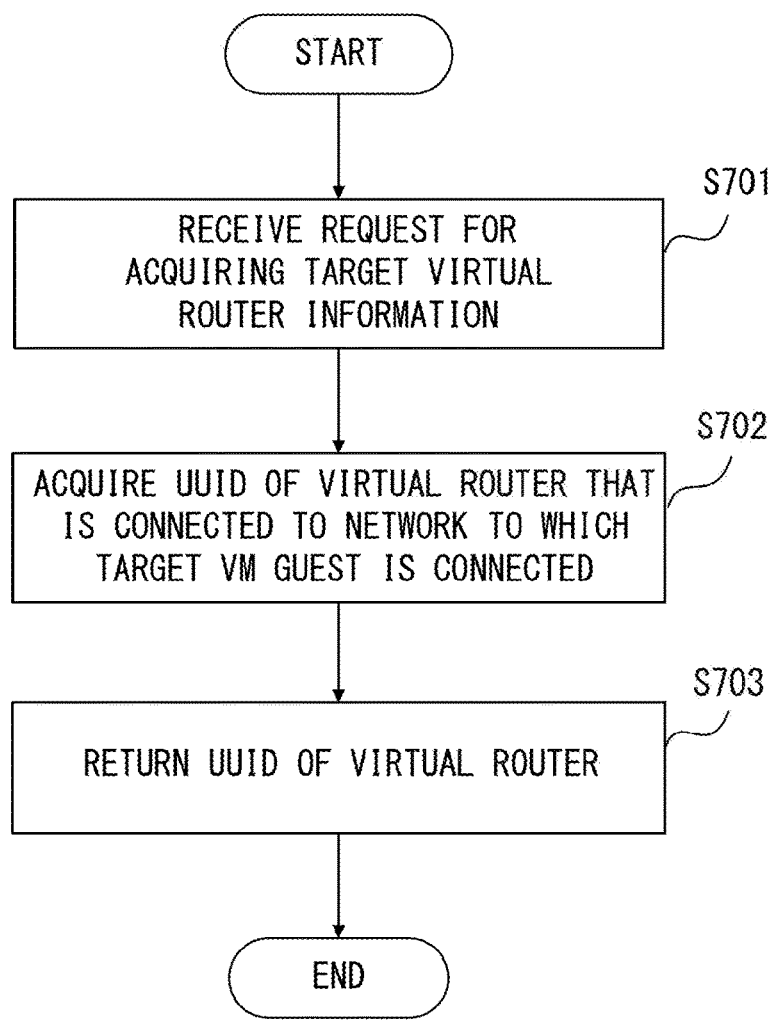
FIG. 23 is an example of the flowchart illustrating details of the response process of the island controller for a request to acquire target virtual router information.

FIG. 23 is an example of the flowchart illustrating details of the response process of the island controller 33 for the request to acquire the target virtual router information. In FIG. 23, the island controller 33 receives from the region manager 31 the request to acquire the target virtual router information (S701). The information of the UUID of the target VM guest 22 is contained in the request to acquire the target virtual router information. Note that the request to acquire the target virtual router information that has been received here is the request that has been transmitted from the region manager 31 in S604 in FIG. 22.

Next, the island controller 33 refers to the network information and acquires the UUID of the virtual router 21 that is connected to the same (virtual) network that the target VM guest 22 is connected to (S702). Specifically, the island controller 33 first extracts from among the records of the network information the record whose value of the data item "virtual router/VM" coincides with the UUID of the target VM guest 22. Next, the island controller 33 selects the record whose value of "network" is the same as that of the extracted record and whose value of "port" indicates a router. Then, the island controller 33 acquires the value of "virtual router/VM" of the selected record as the UUID of the virtual router 21 that is connected to the same network that the target VM guest 22 is connected to.

Next, the island controller 33 transmits to the region manager 31 the UUID of the virtual router 21 that is connected to the same (virtual) network that the target VM guest 22 is connected to (S703). Then, the process is terminated.

(Global-IP Allocation Cancellation Process)

The global-IP allocation cancellation process is part of the setting process of the network equipment for cancelling Internet-connection of the VM guest 22.

The global-IP allocation cancellation process is executed in a case in which the user terminal 11 makes a global-IP address allocation cancellation request to the VM guest 22. In the global-IP allocation cancellation process, settings are configured on the virtual router 21, the gateway 18, the core L3 switch 14, and the gateway router 13.

Details of the global-IP allocation cancellation process are the same as the global-IP allocation process that has been described in FIG. 22 except that the IP allocation operation is replaced with an IP allocation cancellation operation. Specifically, the process that is performed by the gateway controller 34 in the NAT setting process in S606 in FIG. 22 is replaced with the following cancellation process. That is, in the cancellation process, the gateway controller 34 cancels the NAT settings on the virtual router 21 that belongs to the same island to which the VM guest 22 that is a cancellation target belongs, the NAT settings having been configured so that the VM guest 22 that is a cancellation target connects to the Internet.

Note that the allocation cancellation settings that have been configured on the target virtual router 21 are automatically reflected in the gateway 18, the core L3 switch 14 and the gateway router 13 for which the dynamic route control protocol is set between themselves and the target virtual router 21.

(Internet-Connection Cancellation Application Process)

The Internet-connection cancellation application process is part of the setting process of the network equipment for cancelling the Internet connection of the VM guest 22.

The Internet-connection cancellation application process is executed in a case in which the user terminal 11 performs the Internet-connection cancellation application process for the VM guest. In the Internet-connection cancellation application process, settings are configured on the virtual router 21, the gateway 18, the core L3 switch 14, and the gateway router 13.

Details of the Internet-connection cancellation application process is the same as the Internet-connection application process that has been described in FIG. 17 except that the setting process that has been performed for the target virtual router 21 and the gateway 18 is replaced with a connection cancellation process. The connection cancellation process is a process for configuring settings so that the target VM guest 22 is not allowed to connect to the Internet. Specifically, in the setting process of the virtual router 21 in S113 in FIG. 17, the gateway controller 34 cancels dynamic route control protocol settings, routing settings, etc. that have been configured so that the target VM guest 22 is allowed to connect to the Internet. In addition in the setting process of the gateway 18 in S114 in FIG. 17, the gateway controller 34 cancels the dynamic route control protocol settings, etc. that have been configured so that the target VM guest 22 is allowed to connect to the Internet. Note that the cancellation process that has been performed for the gateway 18 is automatically reflected in the core L3 switch 14 and the gateway router 13 for which the dynamic route control protocol is set between themselves and the gateway 18.

Figure 24:
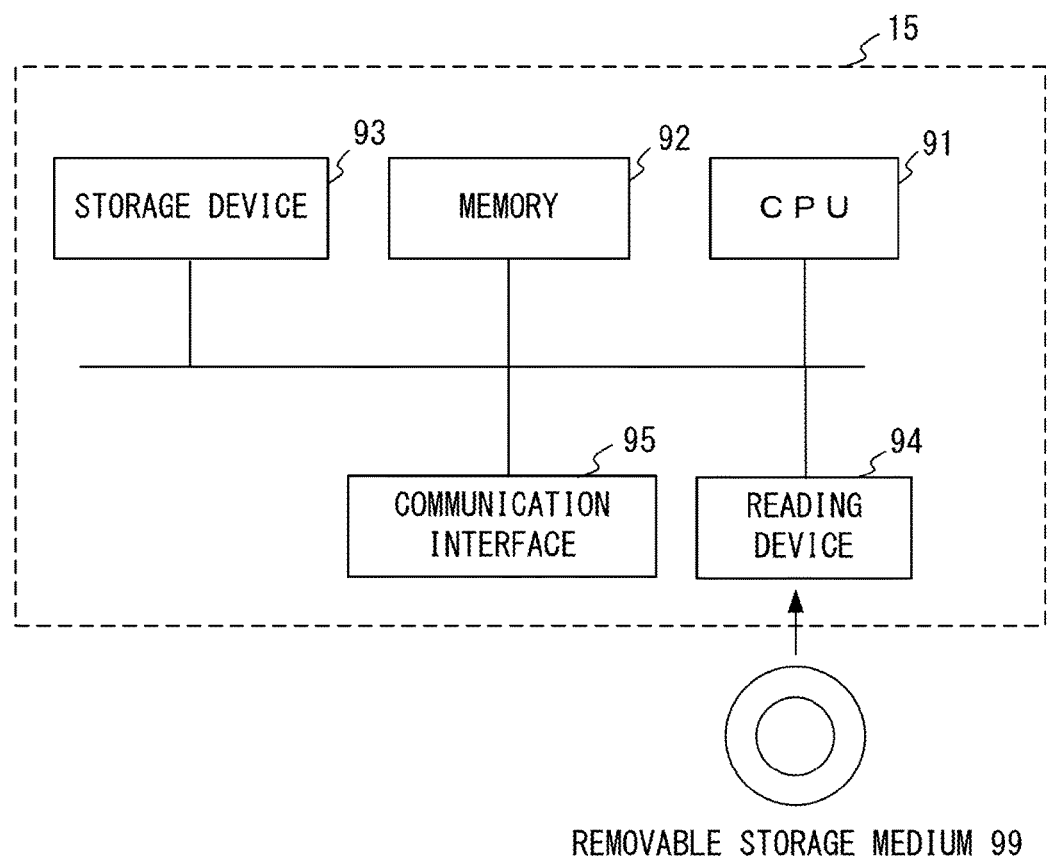
FIG. 24 illustrates an example of the hardware configuration of a physical server according to the embodiment.

Next, an example of the hardware configuration of the physical server 15 according to the embodiment will be described. FIG. 24 illustrates an example of the hardware configuration of the physical server 15 according to the embodiment. The physical server 15 may provide some or a specified combination of functions from among the functions of the region manager 31, the end-point manager 32, the island controller 33, the gateway controller 34 and the agent 35.

In FIG. 24, the physical server 15 is an example of the processor of a computer and includes a central processing unit (CPU) 91, a memory 92, a storage device 93, a reading device 94, and an communication interface 95. The CPU 91, the memory 92, the storage device 93, the reading device 94, and the communication interface 95 are interconnected via a bus.

The CPU 91 provides some or all of the functions of the region manager 31 and the end-point manager 32 by executing a program that describes procedures of the above flowcharts by using the memory 92. In addition, the CPU 91 provides some or all of the functions of the island controller 33, the gateway controller 34 and the agent 35 by executing a program that describes procedures of the above flowcharts by using the memory 92.

The memory 92 is, for example, a semiconductor memory and is configured by including a random access memory (RAM) area and a read only memory (ROM) area. The memory 92 is an example of the storage unit 2 and stores some or a specified combination of the RMDB, the model information, the EMDB, the ICDB, and the GCDB. The storage device 93 is, for example, a hard disk. Note that the storage device 93 may be a semiconductor memory such as a flash memory. In addition, the storage device 93 may be an external recording device. The storage device 93 may store some or a specified combination of the RMDB, the model information, the EMDB, the ICDB, and the GCDB.

The reading device 94 accesses a removable storage medium 99 according to instructions from the CPU 91. The removable storage medium is realized by, for example, a semiconductor device (USB memory, etc.), a medium to and from which information is input and output due to magnetic action (magnetic disk, etc.), or a medium to and from which information is input and output due to optical action (CD-ROM, DVD, etc.). Note that the reading device 94 may not be included in the physical server 15.

The communication interface 95 communicates via a network with another physical server 15, the user terminal 11, the administrator terminal 12, and other network equipment according to an instruction from the CPU 91.

The program according to the embodiment is provided to the physical server 15, for example, in the following modes.
(1) installed in advance in the storage device 93
(2) provided by means of the removable storage medium 99
(3) provided from a program server (not illustrated) via the communication interface 95

In addition, part of the physical server 15 according to the embodiment may be realized by hardware. Alternatively, the physical server 15 according to the embodiment may be realized by a combination of software and hardware.

Note that the UUIDs of the virtual router and the virtual server in the present embodiment may be identifying information of the virtual router and identifying information of the virtual server, respectively.

Note that the present embodiment is not limited to the embodiment that has been described above, and various configurations or embodiments can be taken within the scope not deviating from the spirit of the present embodiment.

The information processing system according to the embodiment enables a setting change of the virtual device between second communication networks that are interconnected via the first communication network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
  a storage device that stores association information that is obtained by associating identifying information of each of a plurality of communication networks with identifying information of a virtual router that exists in each of the plurality of communication networks, the plurality of communication networks being interconnected via a first communication network, the identifying information of each of the plurality of communication networks including first identifying information identifying an availability zone and second identifying information identifying an island included in the availability zone, the availability zone being a unit of a data center, the island being a unit of a device group included in one network connected to an external network external to the island, and
  a microprocessor that executes a process including:
  specifying according to the association information a second communication network in which a target virtual device exists among the plurality of communication networks, in a case in which a request for a setting change to the target virtual device is acquired, the target virtual device being one of the virtual routers existing in the plurality of communication networks;
  specifying a physical server on which the target virtual device runs from among physical servers that exist in the specified second communication network; and
  performing the setting change to the target virtual device that runs on the specified physical server.

2. The information processing system according to claim 1, wherein:
  the storage device further stores system information that is obtained by associating identifying information of a virtual server with the identifying information of the virtual router, the virtual server and the virtual router existing in an identical communication network among the plurality of communication networks; and
  in a case in which a connection request to a virtual server is received, the microprocessor acquires according to the system information identifying information of the virtual router that corresponds to the virtual server for which the connection request has been made, specifies the second communication network in which the virtual router that corresponds to the virtual server exists according to the acquired identifying information of the virtual router and the association information, and performs a setting change of route control for connecting the virtual server, for which the connection request has been made, to the first communication network with respect to the virtual router, which corresponds to the virtual server, and a gateway for connecting the specified second communication network to the first communication network.

3. The information processing system according to claim 2, wherein
  the storage device further stores setting information that is obtained by associating information that indicates a model of a gateway for each of the plurality of communication networks with information that indicates a setting content according to the model, and
  the microprocessor configures according to the setting information settings according to a model of a gateway that interconnects the specified second communication network and another network.

4. The information processing system according to claim 2, wherein
  the microprocessor sets a protocol for dynamically exchanging route information between the virtual router that corresponds to the virtual server and a gateway that interconnects the specified second communication network and another network on the gateway and the virtual router that corresponds to the virtual server.

5. The information processing system according to claim 1, wherein
  the physical server on which the target virtual device runs is specified by receiving a name of the physical server returned by the physical server as a response to a request to acquire the name, the name of the physical server being returned when the target device runs on the physical server.

6. A non-transitory computer-readable recording medium having stored therein a program for causing a computer to execute a process, the process comprising:
  in a case in which a request for a setting change to a target virtual device is acquired, specifying a second communication network in which the target virtual device exists among a plurality of communication networks according to association information that is stored in a storage device, the target virtual device being one of the virtual routers existing in the plurality of communication networks, the association information being obtained by associating identifying information of each of the plurality of communication networks with identifying information of a virtual router that exists in each of the plurality of communication networks, the plurality of communication networks being interconnected via a first communication network, the identifying information of each of the plurality of communication networks including first identifying information identifying an availability zone and second identifying information identifying an island included in the availability zone, the availability zone being a unit of a data center, the island being a unit of a device group included in one network connected to an external network external to the island;

specifying a physical server on which the target virtual device runs from among physical servers that exist in the specified second communication network; and performing the setting change to the target virtual device that runs on the specified physical server.

7. The non-transitory computer-readable recording medium according to claim 6, wherein the physical server on which the target virtual device runs is specified by receiving a name of the physical server returned by the physical server as a response to a request to acquire the name, the name of the physical server being returned when the target device runs on the physical server.

8. An information processing method performed by a computer, the information processing method comprising:

in a case in which a request for a setting change to a target virtual device is acquired, specifying a second communication network in which the target virtual device exists among a plurality of communication networks according to association information that is stored in a storage device, the target virtual device being one of the virtual routers existing in the plurality of communication networks, the association information being obtained by associating identifying information of each of the plurality of communication networks with identifying information of a virtual router that exists in each of the plurality of communication networks, the plurality of communication networks being interconnected via a first communication network, the identifying information of each of the plurality of communication networks including first identifying information identifying an availability zone and second identifying information identifying an island included in the availability zone, the availability zone being a unit of a data center, the island being a unit of a device group included in one network connected to an external network external to the island;

specifying a physical server on which the target virtual device runs from among physical servers that exist in the specified second communication network; and performing the setting change to the target virtual device that runs on the specified physical server.

9. The information processing method according to claim 8, wherein the physical server on which the target virtual device runs is specified by receiving a name of the physical server returned by the physical server as a response to a request to acquire the name, the name of the physical server being returned when the target device runs on the physical server.

* * * * *